US012217587B2

United States Patent
Sakai et al.

(10) Patent No.: US 12,217,587 B2
(45) Date of Patent: Feb. 4, 2025

(54) WIRELESS TERMINAL DETECTION SYSTEM, WIRELESS TERMINAL DETECTION DEVICE, WIRELESS TERMINAL DETECTION METHOD, AND STORAGE MEDIUM HAVING PROGRAM STORED THEREIN

(71) Applicant: NEC Corporation, Tokyo (JP)

(72) Inventors: Jun Sakai, Tokyo (JP); Masaki Kitsunezuka, Tokyo (JP); Toshiki Takeuchi, Tokyo (JP); Taichi Ohtsuji, Tokyo (JP); Shoji Nishimura, Tokyo (JP); Yasufumi Hirakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 353 days.

(21) Appl. No.: 17/625,412

(22) PCT Filed: Jul. 10, 2020

(86) PCT No.: PCT/JP2020/027050
§ 371 (c)(1),
(2) Date: Jan. 7, 2022

(87) PCT Pub. No.: WO2021/010330
PCT Pub. Date: Jan. 21, 2021

(65) Prior Publication Data
US 2022/0270460 A1    Aug. 25, 2022

(30) Foreign Application Priority Data
Jul. 12, 2019    (JP) .................................. 2019-130569

(51) Int. Cl.
*G08B 21/02* (2006.01)
*G08B 25/10* (2006.01)
(Continued)

(52) U.S. Cl.
CPC ............ *G08B 21/02* (2013.01); *G08B 25/10* (2013.01); *H04W 4/029* (2018.02); *H04W 4/38* (2018.02)

(58) Field of Classification Search
CPC ....... G08B 21/02; G08B 25/10; H04W 4/029; H04W 4/38
See application file for complete search history.

(56) References Cited

U.S. PATENT DOCUMENTS

2006/0094230 A1    5/2006  Fuller et al.
2018/0211507 A1    7/2018  Ihara et al.

FOREIGN PATENT DOCUMENTS

| JP | 2009-230250 A | 10/2009 |
|---|---|---|
| JP | 2011-203951 A | 10/2011 |
| WO | 2017/026155 A1 | 2/2017 |

OTHER PUBLICATIONS

International Search Report for PCT Application No. PCT/JP2020/027050, mailed on Sep. 1, 2020.

*Primary Examiner* — Daniell L Negron
(74) *Attorney, Agent, or Firm* — Sughrue Mion, PLLC

(57) ABSTRACT

A wireless terminal detection system provided with user position information acquisition means for measuring a position of a reception-side wireless terminal; pattern classification means for classifying movement patterns extracted from position history information of the reception-side wireless terminal into ordinary patterns and non-ordinary patterns based on classification results in which the movement patterns are classified in accordance with times and positions; and determination means for determining whether a transmission-side wireless terminal, which is a transmission source of radio waves received by the reception-side wireless terminal, is a suspicious terminal based on a reception (Continued)

history of radio waves from the transmission-side wireless terminal in time intervals classified as the non-ordinary patterns.

9 Claims, 20 Drawing Sheets

(51) Int. Cl.
*H04W 4/029* (2018.01)
*H04W 4/38* (2018.01)

FIG. 2

| MEASUREMENT DATE/TIME | USER POSITION | | RESTING/MOVING | ORDINARY/ NON-ORDINARY |
|---|---|---|---|---|
| | LATITUDE | LONGITUDE | | |
| MONTH/DAY/HOUR/ MINUTE/**SECOND | XX° XX' XX.X" N | XX° XX' XX.X" E | RESTING 1 | ORDINARY |
| MONTH/DAY/HOUR/ MINUTE/**SECOND | XX° XX' XX.X" N | XX° XX' XX.X" E | RESTING 1 | ORDINARY |
| ... | ... | ... | ... | ... |

FIG. 3

| IDENTIFICATION INFORMATION | RECEPTION DATE/TIME | RECEPTION POSITION | | ORDINARY/NON-ORDINARY |
|---|---|---|---|---|
| | | LATITUDE | LONGITUDE | |
| | MONTH/DAY/HOUR/MINUTE/**SECOND | XX° XX' XX.X" N | XX° XX' XX.X" E | ORDINARY 1 |
| (IDENTIFICATION INFORMATION) | MONTH/DAY/HOUR/MINUTE/**SECOND | XX° XX' XX.X" N | XX° XX' XX.X" E | ORDINARY 1 |
| | ... | ... | ... | ... |

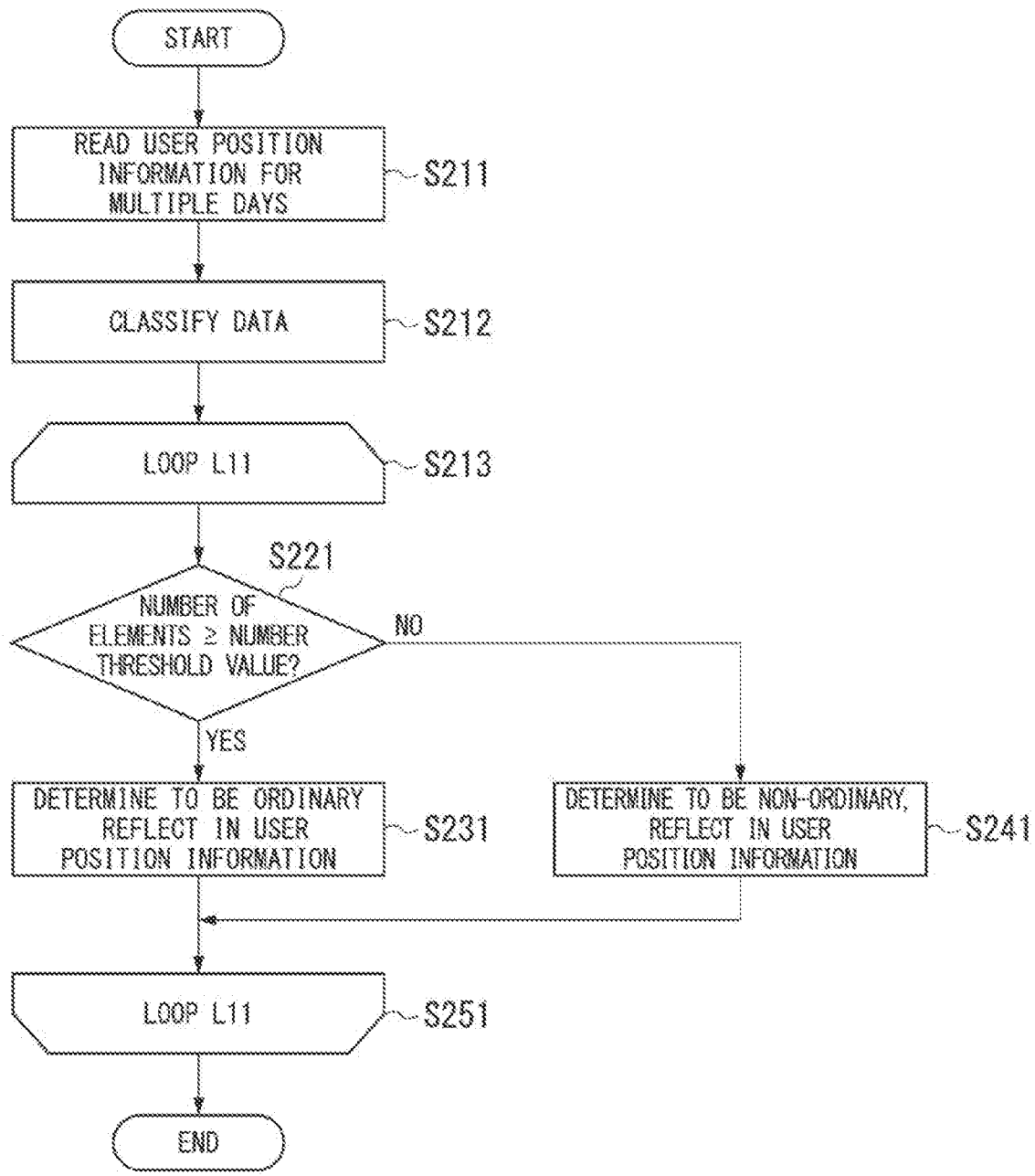

FIG. 9

| MEASUREMENT DATE/TIME | USER POSITION | | RESTING/ MOVING | ORDINARY/ NON-ORDINARY |
|---|---|---|---|---|
| | LATITUDE | LONGITUDE | | |
| MONTH/DAY/HOUR/ MINUTE/**SECOND | XX° XX' XX.X" N | XX° XX' XX.X" E | RESTING 1 | ... |
| ... | ... | ... | ... | ... |
| MONTH/DAY/HOUR/ MINUTE/**SECOND | XX° XX' XX.X" N | XX° XX' XX.X" E | RESTING 1 | ... |
| MONTH/DAY/HOUR/ MINUTE/**SECOND | XX° XX' XX.X" N | XX° XX' XX.X" E | MOVING 1 | ... |
| ... | ... | ... | ... | ... |
| MONTH/DAY/HOUR/ MINUTE/**SECOND | XX° XX' XX.X" N | XX° XX' XX.X" E | MOVING 1 | ... |
| MONTH/DAY/HOUR/ MINUTE/**SECOND | XX° XX' XX.X" N | XX° XX' XX.X" E | RESTING 2 | ... |
| ... | ... | ... | ... | ... |
| MONTH/DAY/HOUR/ MINUTE/**SECOND | XX° XX' XX.X" N | XX° XX' XX.X" E | RESTING 2 | ... |
| MONTH/DAY/HOUR/ MINUTE/**SECOND | XX° XX' XX.X" N | XX° XX' XX.X" E | MOVING 2 | ... |

L111, L112, L113

TIME →

FIG. 13

| STARTING DATE/TIME | ENDING DATE/TIME | ASSOCIATE NAME |
|---|---|---|
| MONTH/DAY/HOUR/MINUTE | MONTH/DAY/HOUR/MINUTE | FAMILY MEMBER |
| MONTH/DAY/HOUR/MINUTE | MONTH/DAY/HOUR/MINUTE | CO-WORKER |
| ⋮ | ⋮ | ⋮ |

WIRELESS TERMINAL DETECTION SYSTEM, WIRELESS TERMINAL DETECTION DEVICE, WIRELESS TERMINAL DETECTION METHOD, AND STORAGE MEDIUM HAVING PROGRAM STORED THEREIN

This application is a National Stage Entry of PCT/JP2020/027050 filed on Jul. 10, 2020, which claims priority from Japanese Patent Application 2019-130569 filed on Jul. 12, 2019, the contents of all of which are incorporated herein by reference, in their entirety.

TECHNICAL FIELD

The present invention relates to a wireless terminal detection system, a wireless terminal detection device, a wireless terminal detection method, and a storage medium having a program stored therein.

BACKGROUND ART

Patent Document 1 describes an information processing device for warning a user that a suspicious person is present in the vicinity. This information processing device registers, in an everyday radio wave information database, radio waves that are detected at the same location every time among the radio wave information detected nearby the user. On the other hand, this information processing device registers radio waves that have been newly acquired, with the radio waves that are detected at the same location every time removed therefrom, in a suspicious person radio wave information candidate database. Furthermore, this information processing device registers, in a suspicious person radio wave information database, radio waves that are detected a prescribed number of times or more among the radio waves registered in the suspicious person radio wave information candidate database. If newly acquired radio waves are registered in the suspicious person radio wave information database, then this information processing device warns the user that a suspicious person is present in the vicinity.

Additionally, Patent Document 2 indicates the feature wherein telephone numbers designated by a user are excluded from among stalker candidates as a whitelist condition.

CITATION LIST

Patent Literature

[Patent Document 1]
WO 2017/026155 A1
[Patent Document 2]
Japanese Unexamined Patent Application, First Publication No. 2011-203951

SUMMARY OF THE INVENTION

Problems to be Solved by the Invention

In order to provide notifications that are beneficial to a user, it is preferable to be able to determine whether or not a person needs to be notified not only based on whether or not radio waves are detected at the same location every time, but also by using other information.

An example of an objective of the present invention is to provide a wireless terminal detection system, a wireless terminal detection device, a wireless terminal detection method, and a storage medium having a program stored therein, which can solve the abovementioned problem.

Means for Solving the Problems

According to a first aspect of the present invention, a wireless terminal detection system is provided with user position information acquisition means for measuring a position of a reception-side wireless terminal; pattern classification means for classifying movement patterns extracted from position history information of the reception-side wireless terminal into ordinary patterns and non-ordinary patterns based on classification results in which the movement patterns are classified in accordance with times and positions; and determination means for determining whether a transmission-side wireless terminal, which is a transmission source of radio waves received by the reception-side wireless terminal, is a suspicious terminal based on a reception history of radio waves from the transmission-side wireless terminal in time intervals classified as the non-ordinary patterns.

According to a second aspect of the present invention, a wireless terminal detection device is provided with user position information acquisition means for measuring a position of a reception-side wireless terminal; pattern classification means for classifying movement patterns extracted from position history information of the reception-side wireless terminal into ordinary patterns and non-ordinary patterns based on classification results in which the movement patterns are classified in accordance with times and positions; and determination means for determining whether a transmission-side wireless terminal, which is a transmission source of radio waves received by the reception-side wireless terminal, is a suspicious terminal based on a reception history of radio waves from the transmission-side wireless terminal in time intervals classified as the non-ordinary patterns.

According to a third aspect of the present invention, a wireless terminal detection method involves measuring a position of a reception-side wireless terminal; classifying movement patterns extracted from position history information of the reception-side wireless terminal into ordinary patterns and non-ordinary patterns based on classification results in which the movement patterns are classified in accordance with times and positions; and determining whether a transmission-side wireless terminal, which is a transmission source of radio waves received by the reception-side wireless terminal, is a suspicious terminal based on a reception history of radio waves from the transmission-side wireless terminal in time intervals classified as the non-ordinary patterns.

According to a fourth aspect of the present invention, a program stored on a storage medium makes a computer execute processes for measuring a position of a reception-side wireless terminal; classifying movement patterns extracted from position history information of the reception-side wireless terminal into ordinary patterns and non-ordinary patterns based on classification results in which the movement patterns are classified in accordance with times and positions; and determining whether a transmission-side wireless terminal, which is a transmission source of radio waves received by the reception-side wireless terminal, is a suspicious terminal based on a reception history of radio waves from the transmission-side wireless terminal in time intervals classified as the non-ordinary patterns.

Advantageous Effects of Invention

The present invention can determine whether or not a user needs to be notified not only based on whether or not radio waves are detected at the same location every time, but also by using other information.

BRIEF DESCRIPTION OF THE DRAWINGS

FIG. 2 is a diagram indicating an example of the data structure of user position information stored in a user position information storage unit according to the first embodiment.

FIG. 3 is a diagram indicating an example of the data structure of nearby terminal information stored in a nearby terminal information storage unit according to the first embodiment.

FIG. 8 is a flow chart indicating an example of a processing procedure by which a pattern classification unit according to the first embodiment determines a movement pattern of a user.

FIG. 9 is a diagram indicating an example of cutout of data that is to be classified by the pattern classification unit according to the first embodiment.

FIG. 13 is a diagram indicating an example of the data structure of associate information stored in an associate information storage unit according to a third embodiment.

EXAMPLE EMBODIMENT

Hereinafter, embodiments of the present invention will be described. However, the embodiments below do not limit the invention according to the claims. Additionally, the entire combinations of the characteristics described in the embodiments are not necessarily essential to the solution provided by the invention.

First Embodiment

Figure 1:
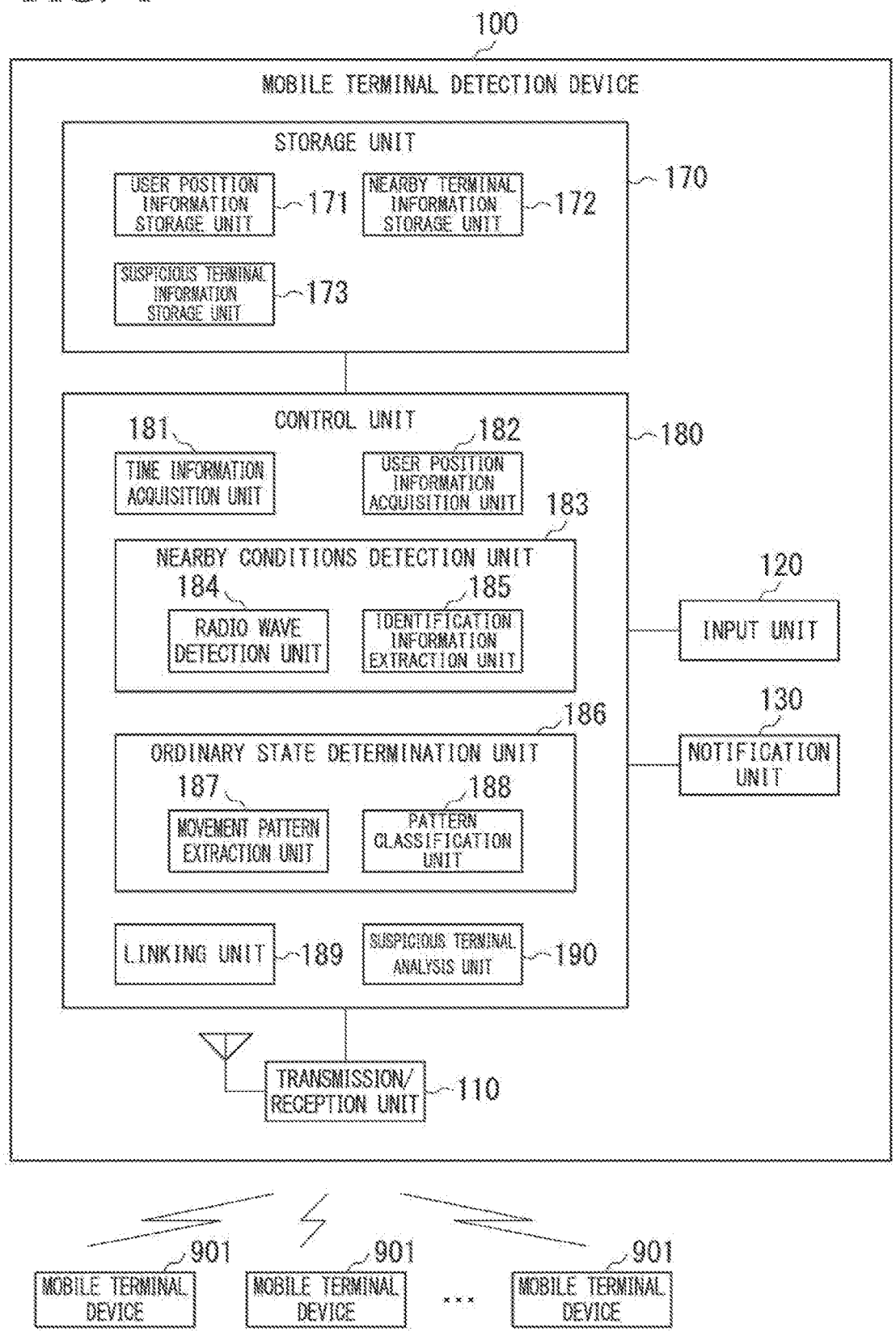
FIG. 1 is a schematic block diagram indicating a functional configuration of a wireless terminal detection device according to a first embodiment.

FIG. 1 is a schematic block diagram indicating the functional configuration of a wireless terminal detection device according to the first embodiment. In the configuration indicated in FIG. 1, a wireless terminal detection device 100 comprises a transmission/reception unit 110, an input unit 120, a notification unit 130, a storage unit 170, and a control unit 180. The storage unit 170 comprises a user position information storage unit 171, a nearby terminal information storage unit 172, and a suspicious terminal information storage unit 173. The control unit 180 comprises a time information acquisition unit 181, a user position information acquisition unit 182, a nearby conditions detection unit 183, an ordinary state determination unit 186, a linking unit 189, and a suspicious terminal analysis unit 190. The nearby conditions detection unit 183 comprises a radio wave detection unit 184 and an identification information extraction unit 185. The ordinary state determination unit 186 comprises a movement pattern extraction unit 187 and a pattern classification unit 188.

Additionally, mobile terminal devices other than the wireless terminal detection device 100 will be referred to as mobile terminal devices 901. The wireless terminal detection device 100 corresponds to an example of a reception-side wireless terminal. The mobile terminal devices 901 correspond to examples of transmission-side wireless terminals.

The mobile terminal devices mentioned here are mobile phones (communication devices that communicatively connect with mobile phone networks provided by mobile phone companies) such as smartphones.

The wireless terminal detection device 100 corresponds to an example of a wireless terminal detection device or a wireless terminal detection system. The wireless terminal detection device or the wireless terminal detection system according to the embodiment is configured, for example, as a device dedicated to wireless terminal detection. However, the wireless terminal detection device or the wireless terminal detection system according to the embodiment may be configured as a general-purpose device, such as being configured by using a mobile terminal device. Additionally, the wireless terminal detection device or the wireless terminal detection system may be configured by combining multiple devices.

The wireless terminal may also be referred to as wireless equipment, a wireless device, a mobile terminal, a mobile terminal device, a mobile phone, or the like.

Additionally, hereinafter, an example of the case in which mobile terminal devices 901 are detected, as examples of wireless terminals, and a user (or carrier) of the wireless terminal device 100 itself is to be notified will be explained. Hereinafter, the user of the wireless terminal detection device 100 itself will also be referred to simply as the user.

However, the wireless terminals that are to be detected by the wireless terminal detection device or the wireless terminal detection system are not limited to being mobile terminal devices. Various devices that transmit radio waves (for example, concealed listening devices or concealed camera devices having signal transmission functions) may be detected by the wireless terminal detection device or the wireless terminal detection system.

The wireless terminal detection device 100 detects and notifies the user of mobile terminal devices 901 satisfying conditions that are set in accordance with movement patterns or activity patterns of the user among the mobile terminal devices 901 located nearby the wireless terminal detection device 100 itself. The movement pattern mentioned here includes staying in the same place (therefore, not moving). Staying in the same place is referred to as resting.

Specifically, the wireless terminal detection device 100 determines whether or not mobile terminal devices 901 are suspicious (suspect) mobile terminal devices 901 based on the detection state of radio waves from the mobile terminal devices 901 during time periods in accordance with the movement patterns of the wireless terminal detection device 100. The movement patterns of the wireless terminal detection device 100 can be considered to be equivalent to the movement patterns of the user.

Hereinafter, a suspicious mobile terminal device 901 will also be referred to as a suspicious terminal. Additionally, a person carrying a suspicious terminal will be referred to as a suspicious person. The suspicious person mentioned here is a person requiring caution as a person who might be persistently following the user. A suspicious person could also be referred to as a stalker.

Upon receiving radio waves from a certain mobile terminal device 901, the wireless terminal detection device 100 reads out a detection history of radio waves from that mobile terminal device 901. The wireless terminal detection device 100 collates the detection history that has been read out with determination conditions, and if the detected mobile terminal device 901 is determined to be a suspicious terminal, notifies the user that a suspicious terminal has been detected.

For example, if a wireless terminal detection device 100 carried by a victim of stalking activity detects a suspicious terminal that has a possibility to be a mobile terminal device 901 carried by a stalker, the user (the victim of stalking activity) is notified. The user who has received the notification can increase vigilance against the stalker and can take measures such as by leaving the area as needed. The wireless terminal device 100 can be similarly used against harmful acts that have a possibility of recurring other than stalking activity, such as groping activity.

A mobile terminal device 901 carried by a stalker will also be referred to as the stalker's mobile terminal device 901. A mobile terminal device 901 carried by a suspicious person will also be referred to as the suspicious person's mobile terminal device 901.

The wireless terminal detection device 100 may treat, as radio waves to be processed, only radio waves having at least a prescribed reception intensity among the radio waves received from mobile terminal devices 901. Alternatively, the wireless terminal detection device 100 may compute the distances from the wireless terminal detection device 100 to mobile terminal devices 901 that are radio wave transmission sources based on radio waves received from the mobile terminal devices 901, and may treat, as radio waves to be processed, only the radio waves from mobile terminal devices 901 located at a prescribed distance or less. Radio wave transmission sources may be referred to simply as transmission sources.

The wireless terminal detection device 100 does not detect suspicious terminals from among all mobile terminal devices 901 from which radio waves can be received, but rather detects suspicious terminals from among mobile terminal devices 901 located close, to some degree, to the wireless terminal detection device 100. In this case, the wireless terminal device 100 can detect suspicious terminals with higher accuracy.

The transmission/reception unit 110 is configured so as to include an antenna, an amplifier and a demodulator, and performs wireless communication with other devices. In particular, the transmission/reception unit 110 receives radio waves transmitted by mobile terminal devices 901 that are to be detected. The radio waves transmitted by the mobile terminal devices 901 in this case do not need to be radio waves addressed to the wireless terminal detection device 100.

The notification unit 130 provides the user with various types of notifications. In particular, if a suspicious terminal is detected, then the notification unit 130 notifies the user that the suspicious terminal has been detected.

For example, the notification unit 130 may comprise a display screen such as a liquid crystal panel or an LED (Light-Emitting Diode) panel, and may provide the user with a notification by screen display, such as by displaying a message.

However, the method by which the notification unit 130 provides a notification is not limited to being a method by the screen display. For example, the notification unit 130 may comprise a speaker and may provide a notification by audio output in addition to or instead of a screen display.

The notification unit 130 may notify the user of the estimated distance to a suspicious terminal in addition to the fact that the suspicious terminal has been detected. The user can increase vigilance as the estimated distance to the suspicious terminal becomes shorter. For example, if the estimated distance to the suspicious terminal is a few meters, then the user can recognize that there is a high probability that a suspicious person such as a stalker is very close to the user, and thus take measures such as by immediately leaving the area.

Additionally, the notification unit 130 may notify the user of history information regarding past instances in which the suspicious terminal was detected in addition to the fact that the suspicious terminal was detected. By referring to the history information, the user can recognize the possibility that a detected suspicious terminal is actually a mobile terminal device 901 of a harasser and can recognize the frequency by which harassment activity was performed.

For example, in the history information regarding past instances in which a certain suspicious terminal was detected, in the case in which the suspicious terminal was detected many times in movement patterns that are classified as not being everyday patterns, it is unlikely that the suspicious terminal would repeatedly appear near the user by chance. Thus, there is a high probability that the carrier of the suspicious terminal is intentionally coming near the user. Therefore, the user can recognize that the suspicious terminal is very likely to actually be a stalker's mobile terminal device 901, and that stalking activity such as persistent following is frequently occurring. The user can then increase vigilance.

The input unit 120 receives notifications from the user. The input unit 120 comprises, for example, an input device such as a touch sensor constituting a touch panel, and receives notifications by means of user operations. For example, a display screen on the notification unit 130 may be configured as a touch panel, and the input unit 120 may detect touch operations on the display screen.

The storage unit 170 stores various types of data. The storage unit 170 is formed by using a storage device provided in the wireless terminal detection device 100.

The user position information storage unit 171 stores user position information. The user position information mentioned here is the position of the wireless terminal detection device 100. Additionally, the user position information mentioned here is position history information of the wireless terminal detection device 100. The user position information storage unit 171 stores information in which positions of the wireless terminal detection device 100 are linked with the dates/times at which the positions were measured, as history information, for example, every constant time period.

FIG. 2 is a diagram indicating an example of the data structure of user position information stored in the user position information storage unit 171. In the example in FIG. 2, the user position information is configured as data in table form, wherein one row indicates the data relating to a single position measurement by the wireless terminal detection device 100.

Additionally, in the example in FIG. 2, the user position information is composed so as to include the categories "Measurement date/time", "User position: Latitude", "User position: Longitude", "Moving/Resting", and "Ordinary/Non-ordinary".

The "Measurement date/time" column contains the dates and times at which positioning was performed (positions were measured). The dates and times at which positioning was performed are also referred to as measurement dates/times.

The example shown in FIG. 2 is an example of the case in which the user position information storage unit 171 stores the measurement dates/times down to units of seconds. However, the degree of specificity by which the user position information storage unit 171 stores the measurement dates/times is not limited thereto. For example, the user position information storage unit 171 may store the measurement dates/times at a degree of specificity that is less specific than seconds, such as by storing them down to units of minutes. Alternatively, the user position information storage unit 171 may store the measurement dates/times in units more specific than seconds, such as by storing them down to units of 0.1 seconds.

The "User position: Latitude" column and the "User position: Longitude" column contain position information of the wireless terminal detection device 100, which are the positioning results, in the form of latitudes and longitudes.

The example shown in FIG. 2 is an example of the case in which the user position information storage unit 171 stores the latitudes and longitudes of the user positions down to units of 0.1 seconds. However, the degree of specificity by which the user position information storage unit 171 stores the user positions is not limited thereto. For example, the user position information storage unit 171 may store the latitudes and the longitudes of the user positions at a degree of specificity that is less specific than 0.1 seconds, such as by storing them down to units of seconds. Alternatively, the user position information storage unit 171 may store the latitudes and the longitudes of the user positions in units more specific than 0.1 seconds, such as by storing them down to units of 0.01 seconds.

Additionally, the form in which the user position information storage unit 171 stores the user positions is not limited to being in the form of latitude and longitude. For example, a reference position may be pre-defined, and the user position information storage unit 171 may store the user positions as relative position information that is relative to the reference position, such as in the form "3512 meters south, 5733 meters east" relative to the reference position.

The "Moving/Resting" column contains movement state labels generated by the movement pattern extraction unit 187 based on the user position measurement results. For example, the movement state labels may be composed of the text string "moving" or "resting" with serial numbers appended thereto. The label "moving" indicates that the wireless terminal detection device 100 is moving. The label "resting" indicates that the wireless terminal detection device 100 is resting.

As mentioned above, resting in this case means staying at the same location. The movement pattern extraction unit 187 to be described below extracts movement patterns of the wireless terminal detection device 100 from the user position information. The movement patterns extracted by the movement pattern extraction unit 187 are classified as either moving or resting. Due to these movement patterns, the wireless terminal detection device 100 is classified as either moving or resting for each of the measurement dates/times indicated in the user position information.

The serial numbers are appended as identification numbers for distinguishing between each instance of moving and each instance of resting.

The wireless terminal detection device 100 moving can be considered to be equivalent to the user moving. The wireless terminal detection device 100 resting can be considered to be equivalent to the user resting. The distinction between moving and resting can be referred to as the movement state.

The form of expression of the movement state label is not limited to being a text string as long as it indicates the distinction between whether the wireless terminal detection device 100 is moving or resting. For example, the movement state label may be indicated by a numerical value, such as moving being indicated by 1 and resting being indicated by 0.

The "Ordinary/Non-ordinary" column contains ordinary/non-ordinary labels generated by the pattern classification unit 188 based on the user position measurement results and the movement state labels. The ordinary/non-ordinary labels indicate the distinction (classification by the pattern classification unit 188) between whether a movement pattern is classified as an ordinary pattern or classified as a non-ordinary pattern. An ordinary pattern is a movement pattern that occurs relatively frequently. A non-ordinary pattern is a movement pattern that occurs relatively rarely.

The state of the user when the movement pattern of the user is classified as an ordinary pattern is referred to as an ordinary state. The state of the user when the movement pattern of the user is classified as a non-ordinary pattern is referred to as a non-ordinary state.

For example, an ordinary/non-ordinary label is indicated by the text string "ordinary" or "non-ordinary". The label "ordinary" indicates that the state of the user is an ordinary state. In other words, the label "ordinary" indicates that the activity pattern or the movement pattern of the user is an ordinary pattern. Specifically, ordinary patterns include daily commuting and work, and regularly visited locations (such as stores, restaurants, bars, hospitals, sports clubs, and culture schools). In contrast therewith, the label "non-ordinary" indicates that the state of the user is a non-ordinary state. In other words, the label "non-ordinary" indicates that the activity pattern or the movement pattern of the user is a non-ordinary pattern. Non-ordinary patterns involve movement to locations not normally or regularly frequented by the user, or activities that are not normally or regularly performed.

The form of expression of the ordinary/non-ordinary label is not limited to being a text string as long as it indicates the distinction between whether the state of the user is an ordinary state or a non-ordinary state. For example, the ordinary/non-ordinary label may be indicated by a numerical value, such as an ordinary state being indicated by the value "1" and a non-ordinary state being indicated by the value "0".

The nearby terminal information storage unit 172 stores nearby terminal information. The nearby terminal information mentioned here is detection history information for mobile terminal devices 901 detected by the wireless terminal detection device 100 as mobile terminal devices 901 nearby the wireless terminal detection device 100 itself. The nearby terminal information storage unit 172 stores, for each mobile terminal device 901 identified by identification information, information in which the identification information identifying the mobile terminal device 901 is linked with reception date/time information regarding reception of radio waves from that mobile terminal device 901 by the wireless terminal detection device 100.

FIG. 3 is a diagram indicating an example of the data structure of nearby terminal information stored in the nearby terminal information storage unit 172. In the example in FIG. 3, the nearby terminal information is configured as data in table form for each mobile terminal device 901 that is a radio wave signal source.

Additionally, in the example in FIG. 3, the nearby terminal information is composed so as to include the categories "Identification information", "Reception date/time", "Reception position: Latitude", "Reception position: Longitude", and "Ordinary/Non-ordinary". Among these categories, there is one item of "Identification information" for each mobile terminal device 901. As for the other categories ("Reception date/time", "Reception position: Latitude", "Reception position: Longitude", and "Ordinary/Non-ordinary"), one row in the table indicates data relating to one instance of detection of received radio waves.

The "Identification information" column contains identification information that the identification information extraction unit 185 extracts from the radio waves received from each mobile terminal device 901. The identification information mentioned here is information for identifying mobile terminal devices 901 that are radio wave transmission sources. In particular, the identification information mentioned here is information for determining whether or not two radio wave transmission sources are the same mobile terminal device 901.

As in the case in which characteristic amounts indicating the properties of analog circuits in mobile terminal devices 901 that are radio wave transmission sources are used as the identification information, as will be described below, the identification information of the same mobile terminal device 901 may have a different value for each set of radio waves received by the transmission/reception unit 110. In this case, the "Identification information" column may be provided for each instance of detection of received radio waves (i.e., each row in the column), in the same manner as the columns for "Reception date/time", "Reception position: Latitude", "Reception position: Longitude", and "Ordinary/Non-ordinary".

The "Reception date/time" column contains date/time information indicating the dates and times at which the transmission/reception unit 110 received the radio waves.

The "Reception position: Latitude" column and the "Reception position: Longitude" column contain position information indicating the positions at which the transmission/reception unit 110 received the radio waves. Specifically, the "Reception position: Latitude" column and the "Reception position: Longitude" column contain position information indicating the user positions (the positions of the wireless terminal detection device 100) when the transmission/reception unit 110 received the radio waves.

The form in which the nearby terminal information storage unit 172 stores reception positions may be the same as the form in which the user position information storage unit 171 stores the user positions. In particular, the degree of specificity by which the nearby terminal information storage unit 172 stores the reception information is not limited to being in units of 0.1 seconds as indicated in FIG. 3. Additionally, the form in which the nearby terminal information storage unit 172 stores the reception positions is not limited to being in the form of latitude and longitude.

The "Ordinary/Non-ordinary" column contains copies of the ordinary/non-ordinary labels stored in the "Ordinary/Non-ordinary" column in the user position information. The ordinary/non-ordinary labels in the nearby terminal information indicate the distinction between whether the user's state was an ordinary state or a non-ordinary state when the transmission/reception unit 110 received the radio waves.

The suspicious terminal information storage unit 173 stores suspicious terminal information. The suspicious terminal information mentioned here is information indicating mobile terminal devices 901 that have been determined to be suspicious terminals among the mobile terminal devices 901 indicated in the nearby terminal information. The suspicious terminal information may be links to nearby terminal information for mobile terminal devices 901 that have been determined to be suspicious terminals.

Alternatively, the suspicious terminal information storage unit 173 may store the suspicious terminal information with a data structure similar to the data structure for the nearby terminal information. For example, the suspicious terminal information storage unit 173 may store, as suspicious terminal information, nearby terminal information for mobile terminal devices 901 that have been determined to be suspicious terminals among the nearby terminal information stored by the nearby terminal information storage unit 172.

However, the suspicious terminal information is not limited to information with a specific data structure as long as it indicates suspicious terminals among the mobile terminal devices 901 indicated by the nearby terminal information. For example, the nearby terminal information indicated in FIG. 3 may be further provided with a "Suspicious terminal" column for each mobile terminal device 901, indicating whether or not that mobile terminal device 901 is a suspicious terminal. In this case, the suspicious terminal information can be indicated together with the nearby terminal information, and there is no need to provide suspicious terminal information separately from the nearby terminal information. Therefore, the wireless terminal detection device 100 does not need to be provided with a suspicious terminal information storage unit 173.

The control unit 180 controls the units in the wireless terminal detection device 100 to perform various types of processes. The functions of the control unit 180 may be executed by a CPU (Central Processing Unit) provided in the wireless terminal detection device 100 reading and executing a program from the storage unit 170.

The time information acquisition unit 181 is configured as a clock that is internal to the wireless terminal detection device 100, and that computes the current date and time.

The user position information acquisition unit 182 measures the current position (current position of the user position information acquisition unit 182 itself) and generates position information. The current position measured by the user position information acquisition unit 182 can be considered to be equivalent to the current position of the wireless terminal detection device 100. Therefore, the user position information acquisition unit 182 measures and acquires, as position information, the current position (user position) of the wireless terminal detection device 100.

The method by which the user position information acquisition unit 182 acquires the position information is not limited to a specific method. For example, the user position information acquisition unit 182 may comprise a GNSS (Global Navigation Satellite System) terminal device and may perform positioning by using signals from the GNSS terminal device (satellite). Alternatively, the user position information acquisition unit 182 may utilize a position estimation system using Wi-Fi (registered trademark) access points, Bluetooth (registered trademark) beacons, or the like.

The user position information acquisition unit 182 repeatedly measures the current position at set time period intervals and stores the obtained position information, linked with the measurement date/time information indicating the measurement dates/times, as user position information (position history information of the wireless terminal detection device 100) stored in the user position information storage unit 171.

Specifically, the user position information acquisition unit 182 writes position information obtained by measuring the current position into the "User position" columns (the "User position: Latitude" column and the "User position: Longitude" column) in a new row (empty row) in the user position information stored in the user position information storage unit 171. Additionally, the user position information acquisition unit 182 acquires time information indicating the current time computed by the time information acquisition unit 181 when the current position is measured. Furthermore, the user position information acquisition unit 182 writes the acquired time information into the "Measurement time" column, in the row in which the position information was written, in the user position information stored in the user position information storage unit 171.

The nearby conditions detection unit 183 detects radio waves from individual mobile terminal devices 901 located nearby the wireless terminal detection device 100, and extracts, from the detected radio waves, identification information for identifying the mobile terminal devices 901 that are transmission sources.

The radio wave detection unit 184 detects the radio waves for each mobile terminal device 901 (the radio waves from the individual mobile terminal devices 901) from among the radio waves received by the transmission/reception unit 110.

For example, in the case of a Wi-Fi (registered trademark) terminal, a probe request signal is periodically transmitted in order to search for access points nearby. Therefore, the probe request signals can be used as the radio waves detected by the radio wave detection unit 184.

Additionally, in the case of terminals for mobile communication lines such as 3G (third-generation mobile communication systems) or LTE (registered trademark, Long Term Evolution), signals for searching for base stations can similarly be used as the radio waves detected by the radio wave detection unit 184.

Additionally, for either type of terminal, radio waves transmitted by the terminals when executing a mail program, a web browser, an SNS (Social Networking Service), or an app (application program) can be used as the radio waves to be detected by the radio wave detection unit 184.

The identification information extraction unit 185 extracts, from the radio waves of individual mobile terminal devices 901 detected by the radio wave detection unit 184 from among the radio waves received by the transmission/reception unit 110, identification information for identifying the mobile terminal devices 901 that are transmission sources.

For example, in the case of Wi-Fi (registered trademark) communication, the transmitted signals include the MAC addresses (Media Access Control addresses) of the transmitting terminals. The identification information extraction unit 185 may use these MAC addresses as the identification information.

Additionally, for wireless terminals such as mobile terminal devices 901, the characteristics of each wireless terminal appear in the transmitted signals due to analog properties of the hardware and the like. Therefore, the identification information extraction unit 185 may measure and save time-series data of the radio waves from individual wireless terminals, and may extract characteristic amounts indicating the characteristics of each wireless terminal as the identification information. Furthermore, the mobile terminal detection device 100 may use extracted characteristic amounts to determine whether or not the transmission source of multiple radio waves is the same wireless terminal.

As the identification information extracted by the identification information extraction unit 185, it is possible to use one or more characteristic amounts among the power spectrum densities of transient (rise and fall) and preamble portions of the received signals, the error vector magnitude (EVM), the IQ phase error, the IQ imbalance, the frequency offset, the symbol clock error, and the like. However, the identification information is not limited to this information.

Alternatively, the identification information extraction unit 185 may extract, as the identification information, the time-series data of the radio waves from individual wireless terminals themselves. In this case, the wireless terminal detection device 100 may acquire correlations in the time-series data of the radio waves from the individual wireless terminals to determine whether or not the wireless terminals that are transmission sources of multiple radio waves are the same.

The ordinary state determination unit 186 determines whether the state of the wireless terminal detection device 100 is an ordinary state or a non-ordinary state. Specifically, the ordinary state determination unit 186 extracts movement patterns of the wireless terminal detection device 100 from the user position information (position history information of the wireless terminal detection device 100) and classifies the extracted movement patterns as either ordinary patterns or non-ordinary patterns. As a result thereof, the ordinary state determination unit 186 determines whether the state of the wireless terminal detection device 100 is an ordinary state or a non-ordinary state.

The movement pattern extraction unit 187 determines whether the wireless terminal detection device 100 is moving or resting based on the user position information. More specifically, the movement pattern extraction unit 187 determines whether the wireless terminal detection device 100 is moving or resting based on the length of time that the position of the wireless terminal detection device 100 is determined to be the same position.

The movement pattern extraction unit 187 determines labels in which moving or resting is combined with a serial number, for example, by defining the first label indicating resting in a day as "resting 1", defining the first label indicating moving as "moving 1", the second label indicating resting as "resting 2", . . . . The movement pattern extraction unit 187 adds user position information (position history information of the wireless terminal 100) to the determined labels. Specifically, the movement pattern extraction unit 187 writes the determined labels in the "Moving/Resting" column of the user position information stored in the user position information storage unit 171.

For example, if the movement state of the wireless terminal detection device 100 during one day begins with a resting state, then the movement pattern extraction unit 187 appends the label "resting 1" to the history information of the wireless terminal detection device 100 for one day until a moving state is first detected. When the wireless terminal detection device 100 detects a moving state for the first time in one day, the movement pattern extraction unit 187 appends the label "moving 1" to the history information until it is detected that the moving state (the first moving state during the one day) has ended. Upon detecting that the first moving state during the one day has ended, the movement pattern extraction unit 187 appends the label "resting 2" to the history information until it is detected that the wireless terminal detection device 100 has next started moving (second moving state during the one day). In this manner, the wireless terminal detection device 100 appends labels to the user position information in the order "resting 1", "moving 1", "resting 2", "moving 2", . . . .

On the other hand, if the movement state of the wireless terminal detection device 100 during one day begins with a moving state, then the movement pattern extraction unit 187 appends the label "moving 1" to the history information until it is detected that the moving state (the first moving state of the wireless terminal detection device 100 during the one day) has ended. Upon detecting that the first moving state of the wireless terminal detection device 100 during the one day has ended, the movement pattern extraction unit 187 appends the label "resting 1" to the history information until the next moving state (second moving state during the one day) is detected. Upon detecting the second moving state during the one day, the movement pattern extraction unit 187 appends the label "moving 2" to the history information until it is detected that the moving state (second moving state during the one day) has ended. In this manner, the wireless terminal detection device 100 appends labels to the user position information in the order "moving 1", "resting 1", "moving 2", "resting 2" . . . .

The movement pattern extraction unit 187 extracts movement patterns from the user position information by determining whether the wireless terminal detection device 100 is moving or resting. Specifically, in the user position information, the intervals from when the wireless terminal detection device 100 starts moving until the movement ends and the intervals from when the wireless terminal detection device 100 starts resting until the rest ends are extracted as movement patterns.

The pattern classification unit 188 classifies the movement patterns extracted from the user position information (position history information of the wireless terminal detection device 100) in accordance with the times and the positions thereof. Furthermore, the pattern classification unit 188 classifies whether the movement patterns are ordinary patterns or non-ordinary patterns in accordance with occurrence frequencies in the classification results. For example, for multiple days, such as one month, of user position information, the pattern classification unit 188 classifies, as ordinary patterns, movement patterns in which the number of plots (sample data) with similar times and positions is equal to or greater than a prescribed condition, and classifies, as non-ordinary patterns, movement patterns other than the ordinary patterns.

In this case, the state of the user in the case where the movement pattern of the user is classified as an ordinary pattern, as described above, will be referred to as an ordinary state. The state of the user in the case where the movement pattern of the user is classified as a non-ordinary pattern will be referred to as a non-ordinary state. Since the movement pattern of the user can be considered to be equivalent to the movement pattern of the wireless terminal detection device 100, the state of the user when the movement pattern of the wireless terminal detection device 100 is classified to be an ordinary pattern corresponds to an ordinary state. The state of the user when the movement pattern of the wireless terminal detection device 100 is classified to be a non-ordinary pattern corresponds to a non-ordinary state The pattern classification unit 188 adds a label indicating the classification result, i.e., ordinary state or non-ordinary state, to the user position information. Specifically, the pattern classification unit 188 writes the determined label into the "Ordinary/Non-ordinary" column in the user position information stored in the user position information storage unit 171.

For example, the pattern classification unit 188 may use machine learning to classify the movement patterns in the manner indicated below.

The pattern classification unit 188 treats the user position information as a vector in the five dimensions of day of the week, time, latitude, longitude and movement state. Alternatively, the pattern classification unit 188 may add movement speed to the user position information and treat it as a six-dimensional vector. The movement speed is determined by computing a movement distance based on the change in longitude and latitude between data from two times (dates/times), computing a time period by taking the difference between the times, and dividing the movement distance by the time period.

For movement patterns extracted from the user position information for a certain period of time such as, for example, one month, if the number of movement patterns in which the numerical values of the above-mentioned five-dimensional vector or the numerical values of the above-mentioned six-dimensional vector are similar is equal to or greater than a prescribed threshold value, then the pattern classification unit 188 classifies those movement patterns as ordinary patterns, and if the number is less than the threshold value, then the pattern classification unit 188 classifies those movement patterns as non-ordinary patterns.

Regarding the determination of the similarity of the numerical values of the above-mentioned vectors, distances may be defined in the above-mentioned five-dimensional vector space or six-dimensional vector space, and the distances may be used to determine similarity or non-similarity.

In the first embodiment, the pattern classification unit 188 classifies elemental data (date/time-separate data) in the user position information into two classes, i.e., the ordinary state or the non-ordinary state. In the case of teacher-less training, for example, a clustering method such as k-means may be used. In the case of teacher-based training, a classifier such as, for example, a decision tree, Random Forest, AdaBoost, or SVM (Support Vector Machine) may be used. Additionally, in the case of teacher-based training, training data can be generated, for example, by the user inputting the distinction between ordinary states and non-ordinary states from the input unit 120.

The linking unit 189 appends ordinary state or non-ordinary state labels to the elemental data (data separate for each mobile terminal device 901 and each date/time of radio wave reception) in the nearby terminal information based on the dates/times thereof. In the case of the example in FIG. 3, the elemental data in the nearby terminal information is one row of data.

Specifically, the linking unit 189 appends, to the elemental data in the nearby terminal information, labels that are the same as the ordinary state or non-ordinary state labels appended to the elemental data (data from single measurements) in the user position information that is the closest in terms of date/time. In the case of the example in FIG. 2, the elemental data in the user position information is one row of data.

The suspicious terminal analysis unit 190 determines whether or not individual mobile terminal devices 901 that are radio wave transmission sources are suspicious terminals. If it is determined that a mobile terminal device 901 that is a radio wave transmission source is a suspicious terminal, then the suspicious terminal analysis unit 190 notifies the user, by means of the notification unit 130, that a suspicious terminal has been detected. Additionally, the suspicious terminal analysis unit 190 registers the suspicious terminal information that has been detected in the suspicious terminal information storage unit 173.

For each item of identification information extracted from the received radio waves, the suspicious terminal analysis unit 190 extracts, from the nearby terminal information, the information linked to that item of identification information. In the first embodiment, the suspicious terminal analysis unit 190 determines, for each item of identification information, whether or not the identification information corresponds to a suspicious terminal based on the number of times that the identification information is detected in the nearby terminal information.

The method by which the suspicious terminal analysis unit 190 determines whether or not a mobile terminal device 901 is a suspicious terminal is not limited to a specific method. For example, the suspicious terminal analysis unit 190 may compute a degree of suspiciousness based on the number of days that the radio waves from a mobile terminal device 901 that is a determination target has been detected in a non-ordinary state, and may determine whether or not a terminal is a suspicious terminal based on the degree of suspiciousness. Furthermore, for example, the suspicious terminal analysis unit 190 may compare the computed degree of suspiciousness with a prescribed threshold value, and may determine that the mobile terminal device 901 that is the determination target is a suspicious terminal when the degree of suspiciousness is determined to be greater than the threshold value.

Alternatively, the suspicious terminal analysis unit 190 may determine whether or not a mobile terminal device 901 that is a determination target is a suspicious terminal based on the lengths of time that the radio waves therefrom have been detected in the non-ordinary state. For example, the suspicious terminal analysis unit 190 may determine a mobile terminal device 901 that is a radio wave transmission source to be a suspicious terminal in the case in which the longest of the lengths of time that are detected is equal to or greater than a threshold value. Alternatively, the suspicious terminal analysis unit 190 may determine whether or not a mobile terminal device 901 that is a determination target is a suspicious terminal based on the cumulative time period during which the radio waves therefrom have been detected in the non-ordinary state. Alternatively, a threshold value (for example, one hour) of the length of time of detection of radio waves may be set. Furthermore, the suspicious terminal analysis unit 190 may determine whether or not a mobile terminal device 901 that is a determination target is a suspicious terminal based on the number of times that the radio waves therefrom have been detected for a length of time exceeding that threshold value.

Alternatively, the suspicious terminal analysis unit 190 counts the number of different movement state labels among those in which the radio waves from a mobile terminal device 901 that is a determination target have been detected in the non-ordinary state. Then, if the number of different movement state labels that have been counted is equal to or greater than a prescribed threshold value, then the suspicious terminal analysis unit 190 may determine the mobile terminal device 901 to be a suspicious terminal. For example, if identification information of a determination target is detected for "resting 1", "moving 2" and "resting 3", then the suspicious terminal analysis unit 190 may count the number of labels as three and compare the number of counted labels with a threshold value.

Furthermore, the suspicious terminal analysis unit 190 may use the counted number of times of detection directly as the degree of suspiciousness. Alternatively, the suspicious terminal analysis unit 190 may use, as the degree of suspiciousness, a number of times of detection per unit time obtained by dividing the counted number of times of detection by the time period in the non-ordinary state. Alternatively, the suspicious terminal analysis unit 190 may compute the degree of suspiciousness by weighting the number of times of detection for each of resting and moving states.

The suspicious terminal analysis unit 190 may determine whether or not a terminal is a suspicious terminal by each of multiple determination methods, and may notify the user of the respective determination results by means of the notification unit 130. The suspicious terminal analysis unit 190 corresponds to an example of a determination unit for determining whether or not notification to the user is required.

Figure 4:
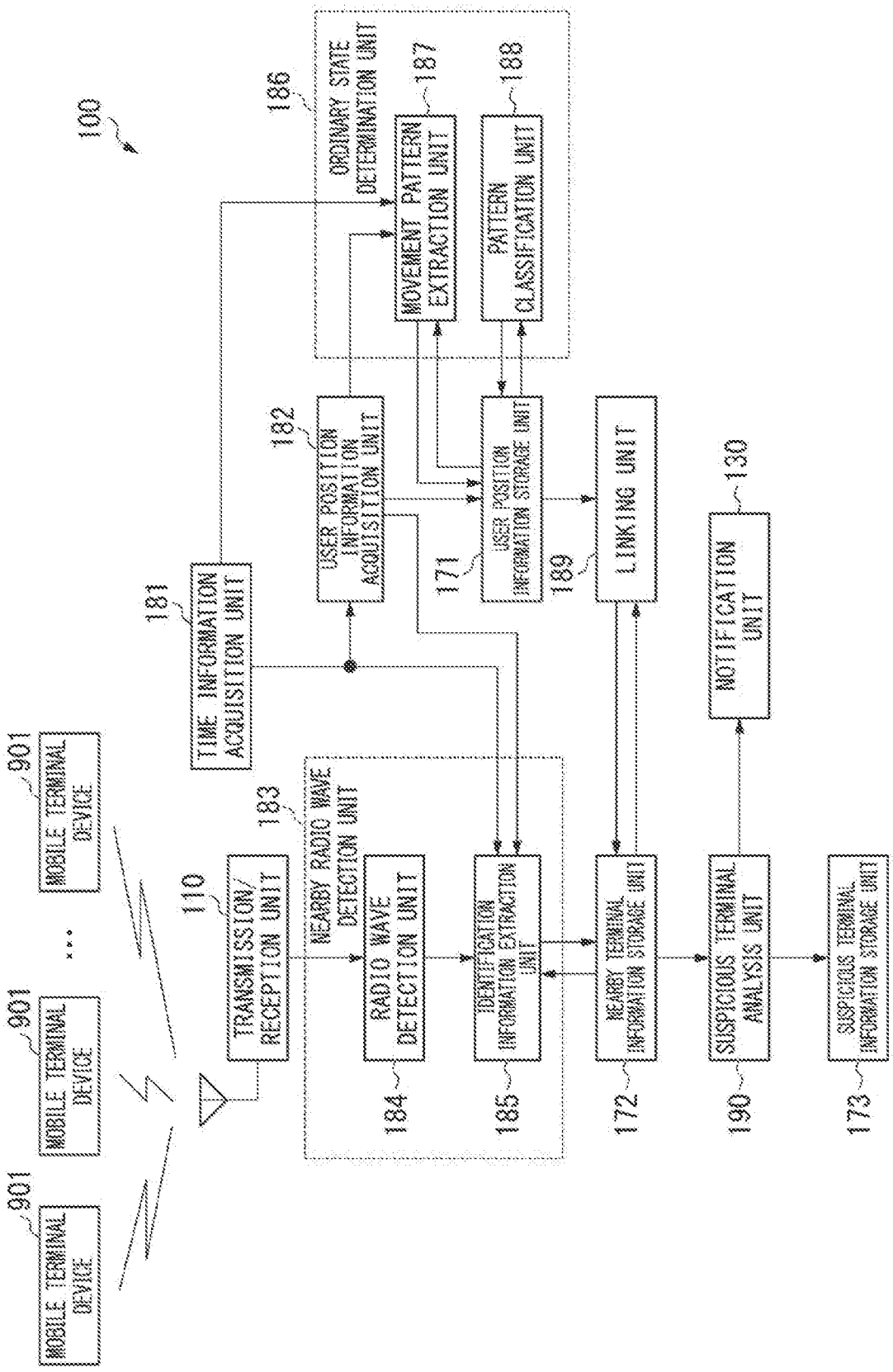
FIG. 4 is a diagram indicating an example of the input and output of data in each unit in the wireless terminal detection device according to the first embodiment.

FIG. 4 is a diagram indicating an example of the input and output of data in each unit in the wireless terminal detection device 100.

In the example in FIG. 4, the transmission/reception unit 110 receives radio waves transmitted by mobile terminal devices 901. The transmission/reception unit 110 outputs reception signals indicating the received radio waves to the radio wave detection unit 184.

The radio wave detection unit 184 detects the radio waves from individual mobile terminal devices 901 from among the radio waves received by the transmission/reception unit 110. The radio wave detection unit 184 outputs the reception signals indicating the detected radio waves to the identification information extraction unit 185.

Additionally, the time information acquisition unit 181 outputs date/time information indicating the current date and time to the user position information acquisition unit 182, the identification information extraction unit 185, and the movement pattern extraction unit 187.

The user position information acquisition unit 182 measures the current position of the wireless terminal detection device 100, links position information indicating the current position with the date/time information from the time information acquisition unit 181, and writes the information into the user position information storage unit 171. As a result thereof, the user position information acquisition unit 182 updates the user position information indicating the history of the position of the wireless terminal detection device 100.

Additionally, the user position information acquisition unit 182 outputs the position information indicating the measured current location to the identification information extraction unit 185 and the movement pattern extraction unit 187.

The identification information extraction unit 185 extracts identification information identifying mobile terminal devices 901 that are radio wave transmission sources from among the radio waves from the individual mobile terminal devices 901 detected by the radio wave detection unit 184. The identification information extraction unit 185 stores, in the nearby terminal information storage unit 172, nearby terminal information in which the extracted identification information is linked with date/time information (current date/time) output from the time information acquisition unit 181 and position information (current position) output from the user position information acquisition unit 182. In this case, the date/time information output from the time information acquisition unit 181 indicates the reception dates/times of the radio waves detected by the radio wave detection unit 184. The position information output from the user position information acquisition unit 182 indicates the reception positions of radio waves detected by the radio wave detection unit 184.

Specifically, the identification information extraction unit 185 uses the extracted identification information to read out nearby terminal information (i.e., nearby terminal information regarding mobile terminal devices 901 that are radio wave transmission sources) linked to the identification information. The nearby terminal information read out by the identification information extraction unit 185 indicates history information for the reception dates/times of radio waves from the mobile terminal devices 901 identified by the identification information. The identification information extraction unit 185 updates the nearby terminal information by adding the latest reception date/time and the latest reception position to the nearby terminal information that has been read out.

The movement pattern extraction unit 187 determines whether the wireless terminal detection device 100 is moving or resting based on the position of the wireless terminal detection device 100 measured by the user position information acquisition unit 182 and the time computed by the time information acquisition unit 181. The movement pattern extraction unit 187 updates the user position information stored in the user position information storage unit 171 by adding the movement state (distinguishing between moving or resting) from the determination results.

The pattern classification unit 188 reads the user position information from the user position information storage unit 171 and classifies movement patterns of the user as being in an ordinary state (ordinary pattern) or a non-ordinary state (non-ordinary pattern). The pattern classification unit 188 updates the user position information stored in the user position information storage unit 171 by adding the classification results (distinguishing between an ordinary state or a non-ordinary state).

The linking unit 189 reads the user position information from the user position information storage unit 171 and reads the nearby terminal information from the nearby terminal information storage unit 172. The linking unit 189 adds, to the elements (information separate for each mobile terminal device 901 that is a radio wave transmission source and each date/time of reception) in the nearby terminal information, the ordinary state or the non-ordinary state information indicated by the elements that are the closest in terms of the date/time among the elements (information separate for each date/time of position measurement) in the user position information. The linking unit 189 updates the nearby terminal information stored in the nearby terminal information storage unit 172 so as to be information to which the ordinary state or the non-ordinary state information has been added.

The suspicious terminal analysis unit 190 reads the nearby terminal information from the user position information storage unit 171 and determines whether or not the mobile terminal devices 901 that are radio wave transmission sources are suspicious terminals. For example, the suspicious terminal analysis unit 190 reads, from the nearby terminal information stored in the user position information storage unit 171, the information for which reception date/time information has been newly added, for each mobile terminal device 901. Furthermore, for example, the suspicious terminal analysis unit 190 references nearby terminal information stored in the user position information storage unit 171 periodically, such as every minute, and reads out the nearby terminal information for mobile terminal devices 901 in which reception dates/times that are newer than the previously referenced date/time are recorded.

The suspicious terminal analysis unit 190 determines whether or not the nearby terminal information that has been read satisfies the conditions for suspicious terminal information. If it is determined that the conditions are satisfied, then the suspicious terminal analysis unit 190 notifies the user, by means of the notification unit 130, that a suspicious terminal has been detected, and stores the nearby terminal information of that mobile terminal device 901 in the suspicious terminal information storage unit 173 as suspicious terminal information. If suspicious terminal information of a mobile terminal device 901 that has been determined to be a suspicious terminal is already stored in the suspicious terminal information storage unit 173, then the suspicious terminal analysis unit 190 updates the suspicious terminal information of that mobile terminal device 901 stored in the suspicious terminal information storage unit 173.

Additionally, the suspicious terminal analysis unit 190 notifies the user, by means of the notification unit 130, that a suspicious terminal has been detected.

Next, the operations of the wireless terminal detection device 100 will be explained by referring to FIG. 5-8.

Figure 5:
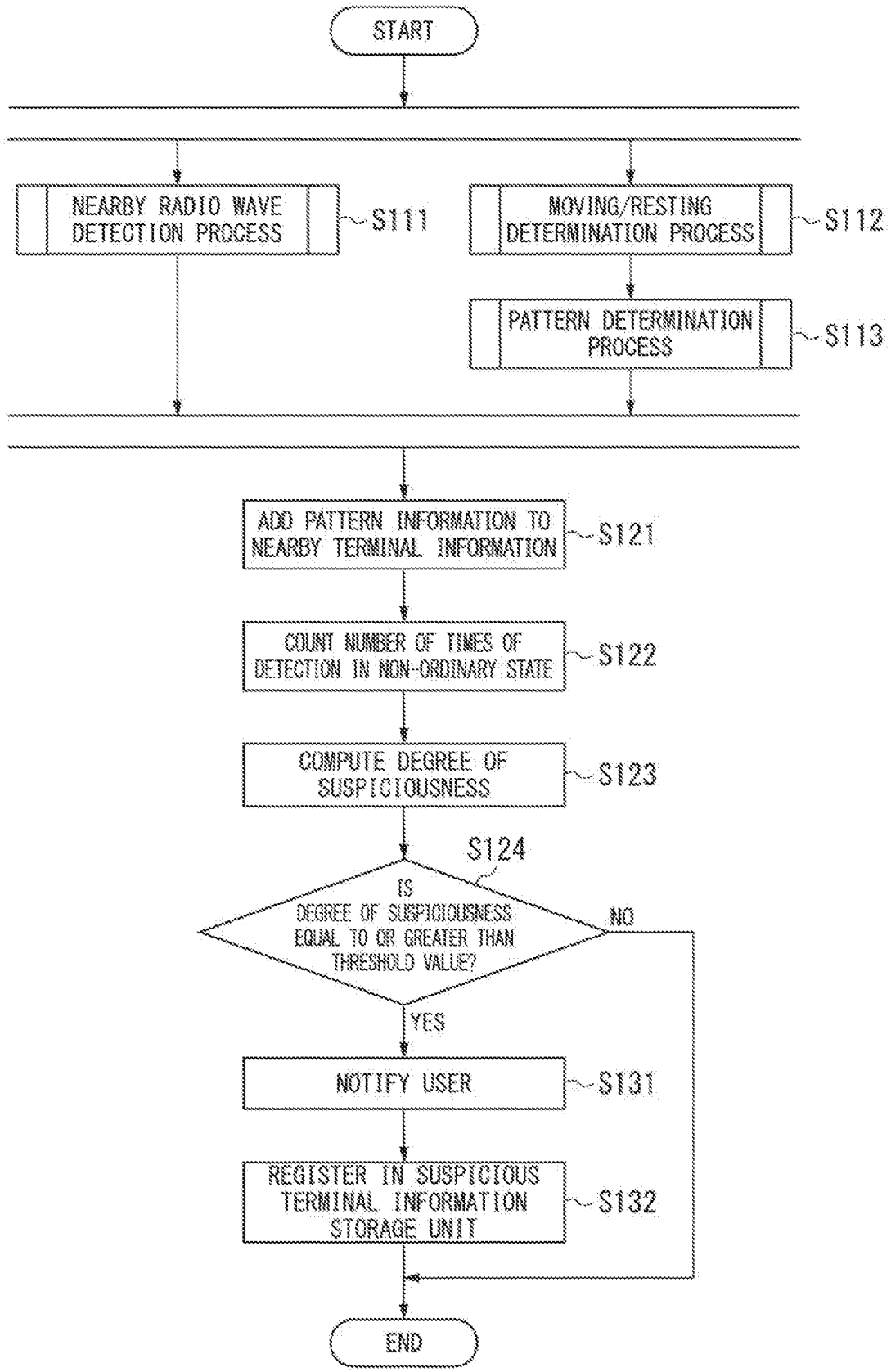
FIG. 5 is a flow chart indicating an example of a processing procedure performed by the wireless terminal detection device according to the first embodiment.

FIG. 5 is a flow chart indicating an example of a processing procedure performed by the wireless terminal detection device 100. The wireless terminal device 100 repeatedly performs the process in FIG. 5 in order to continuously monitor the radio waves from the mobile terminal devices 901.

In the process in FIG. 5, the nearby conditions detection unit 183 detects the radio waves from each of the mobile terminal devices (mobile terminal devices 901) nearby the wireless terminal detection device 100 from among the radio waves received by the transmission/reception unit 110, and updates the nearby terminal information of mobile terminal devices 901 that are radio wave transmission sources in the nearby terminal information stored in the nearby terminal information storage unit 172 (step S111).

Additionally, the ordinary state determination unit 186 determines whether the state of the user is moving or resting based on the position information of the wireless terminal detection device 100, and adds a label indicating the determination result to the user position information (step S112).

After step S112, the pattern classification unit 188 determines the movement pattern of the user and adds a label indicating the determination result to the user position information (step S113).

After steps S111 and S113, the linking unit 189 adds an ordinary state or a non-ordinary state label to the elements of the nearby terminal information stored in the nearby terminal information storage unit 172 (step S121).

Next, the suspicious terminal analysis unit 190 references the nearby terminal information stored in the nearby terminal information storage unit 172 for each mobile terminal device 901 that is a radio wave transmission source, and counts the number of times of detection of radio waves received from that mobile terminal device 901 in the non-ordinary state (step S122). Then, the suspicious terminal analysis unit 190 computes the degree of suspiciousness of the mobile terminal device 901 based on the counted number of times of detection (step S123) and determines whether or not the computed degree of suspiciousness is equal to or greater than a threshold value (step S124).

For example, the suspicious terminal analysis unit 190 may use the counted number of times of detection directly as the degree of suspiciousness. Alternatively, the suspicious terminal analysis unit 190 may use, as the degree of suspiciousness, a number of times of detection per unit time obtained by dividing the counted number of times of detection by the time period in the non-ordinary state. Alternatively, the suspicious terminal analysis unit 190 may compute the degree of suspiciousness by weighting the number of times of detection for each of resting and moving states.

If it is determined that the degree of suspiciousness is equal to or greater than the threshold value (step S124: YES), then the suspicious terminal analysis unit 190 notifies the user, by means of the notification unit 130, that the suspicious terminal has been detected (step S131). Additionally, the suspicious terminal analysis unit 190 registers, as suspicious terminal information in the suspicious terminal information storage unit 173, the nearby terminal information of mobile terminal devices 901 that have been determined to be suspicious terminals (step S132). For example, the suspicious terminal analysis unit 190 stores, as suspicious terminal information in the suspicious terminal information storage unit 173, links to the nearby terminal information of mobile terminal devices 901 that have been determined to be suspicious terminals.

After the process in step S132, the wireless terminal detection device 100 ends the process in FIG. 5.

On the other hand, if the suspicious terminal analysis unit 190 determines that the degree of suspiciousness is lower than the threshold value in step S124 (step S124: NO), then the wireless terminal detection device 100 ends the process in FIG. 5. Therefore, in this case, the wireless terminal detection device 100 does not notify the user that a suspicious terminal has been detected and does not register suspicious terminal information.

Figure 6:
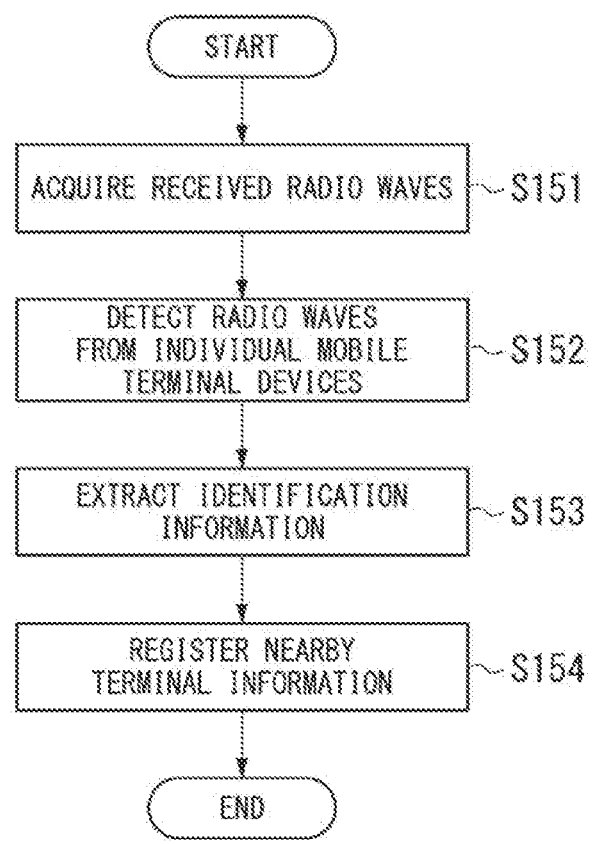
FIG. 6 is a flow chart indicating an example of a processing procedure by which the wireless terminal detection device according to the first embodiment detects nearby radio waves.

FIG. 6 is a flow chart indicating an example of a processing procedure by which the wireless terminal detection device 100 detects nearby radio waves. The wireless terminal detection device 100 performs the process of FIG. 6 in step S111 in FIG. 5.

In the process of FIG. 6, the radio wave detection unit 184 acquires radio waves received by the transmission/reception unit 110 (step S151). Specifically, upon receiving radio waves, the transmission/reception unit 110 outputs reception signals indicating the received radio waves. The radio wave detection unit 184 acquires the radio waves received by the transmission/reception unit 110 as reception signals.

Then, the radio wave detection unit 184 detects the radio waves from individual mobile terminal devices 901 from among the radio waves received by the transmission/reception unit 110 (step S152).

Next, the identification information extraction unit 185 extracts identification information from among the radio waves from the individual mobile terminal devices 901 detected by the radio wave detection unit 184 (step S153).

Then, the identification information extraction unit 185 registers, in the nearby terminal information storage unit 172, nearby terminal information in which the extracted identification information is linked with reception dates/times and reception positions (step S154). Specifically, the identification information extraction unit 185 writes the reception dates/times and reception positions of the latest received signals into the nearby terminal information of mobile terminal devices 901 identified by the extracted identification information among the nearby terminal information stored in the nearby terminal information storage unit 172.

After step S154, the wireless terminal detection device 100 ends the process in FIG. 6 and returns to the process in FIG. 5.

Figure 7:
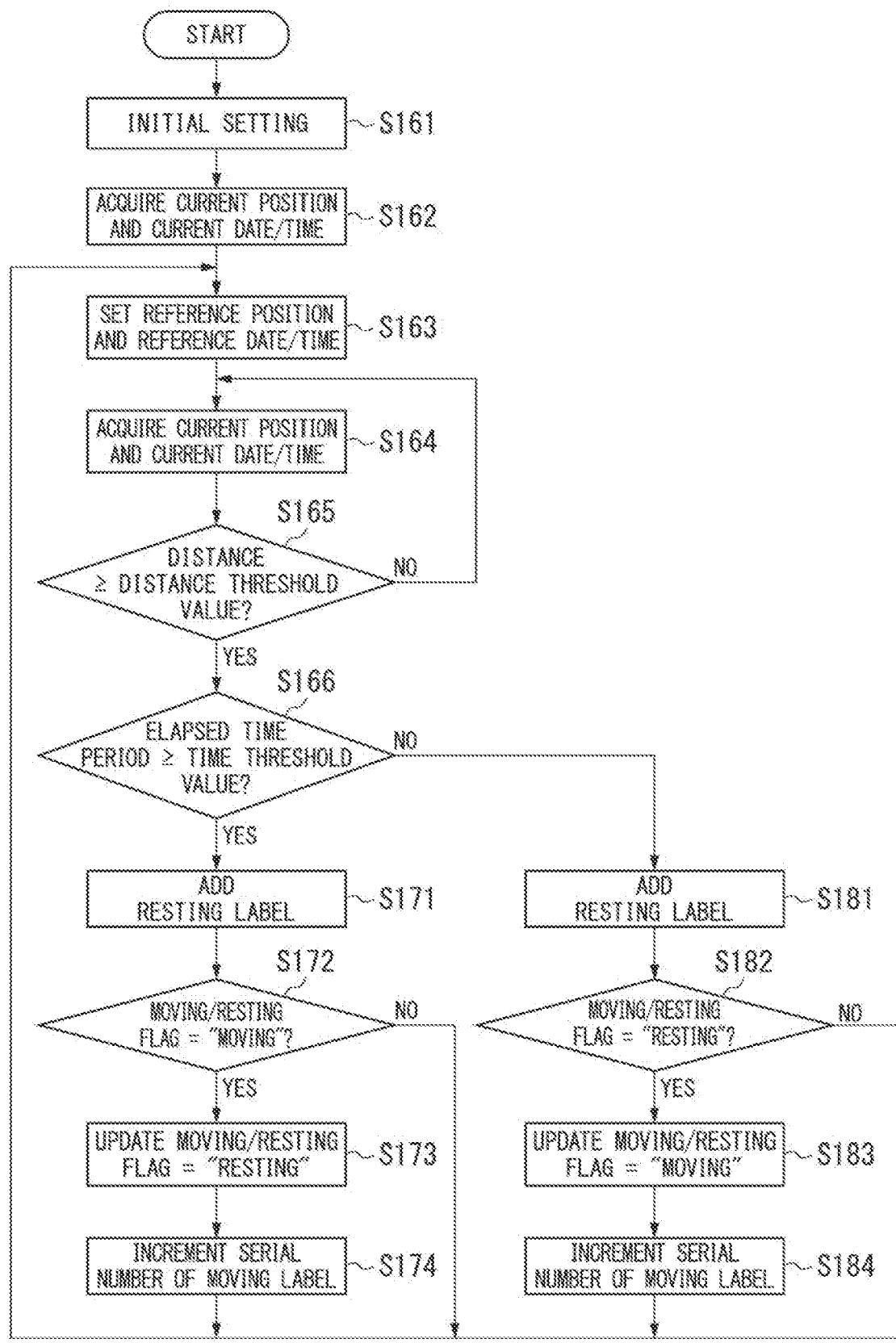
FIG. 7 is a flow chart indicating an example of a processing procedure by which a movement pattern extraction unit according to the first embodiment determines whether a user is moving or resting.

FIG. 7 is a flow chart indicating an example of a processing procedure by which the movement pattern extraction unit 187 determines whether a user is moving or resting. The movement pattern extraction unit 187 performs the process of FIG. 7 as a time-division process within the time period allocated to step S112 in FIG. 5. In other words, the movement pattern extraction unit 187 executes the process of FIG. 7 in the time period allocated to step S112 in FIG. 5. If the allocated time period ends, then the process of FIG. 7 is interrupted, and the process of FIG. 7 resumes from the interrupted state the next time step S112 in FIG. 5 is executed.

Alternatively, the wireless terminal detection device 100 may execute the process of FIG. 5 and the process of FIG. 7 in parallel. In this case, there is no need to provide a processing step for the process of FIG. 7 within the process of FIG. 5. Therefore, step S112 is omitted.

In the process of FIG. 7, an initial setting is performed for determination (step S161).

Specifically, the movement pattern extraction unit 187 sets the value of the moving label variable to "moving 1" and sets the value of the resting label variable to "resting 1".

The moving label variable is a variable indicating the value of the moving label. The value of the moving label variable is initially set to "moving 1", and each time a moving state ends (i.e., with each transition from moving to resting), the serial number is incremented by one, in the manner of "moving 2", "moving 3", . . . .

The resting label variable is a variable indicating the value of the resting label. The value of the resting label variable is initially set to "resting 1", and each time a resting state ends (i.e., with each transition from resting to moving), the serial number is incremented by one, in the manner of "resting 2", "resting 3", . . . .

Additionally, the movement pattern extraction unit 187 sets the value of the moving/resting flag to "initial state". The resting state flag is a flag indicating the determination result for the previous determination. The resting state flag is used to detect update timings for the serial numbers of the moving labels and the resting labels.

The value "moving" in the moving/resting flag indicates that the wireless terminal detection device 100 is moving. The value "resting" in the moving/resting flag indicates that the wireless terminal detection device 100 is resting. The value "initial state" in the moving/resting flag indicates that the latest determination is the first determination after initialization, and that a previous determination does not exist.

Next, the movement pattern extraction unit 187 acquires the current position measured by the user position information acquisition unit 182 and the current date/time measured by the time information acquisition unit 181 (step S162).

Then, the movement pattern extraction unit 187 sets the newest current position and date/time that have been acquired as a reference position and a reference date/time (step S163). The reference position and the reference date/time are used as references for computing the movement distance and the elapsed time period in order to determine whether the state of the wireless terminal detection device 100 is a reference state or a movement state. When the distance between the reference position and the current position becomes equal to or greater than a prescribed distance threshold value, the movement pattern extraction unit 187 determines that the state is a moving state if the elapsed time period from the reference date/time to the current date/time is equal to or greater than a prescribed time period threshold value, and determines that the state is a moving state if the elapsed time period is less than the time period threshold value.

Next, the movement pattern extraction unit 187 acquires the current position measured by the user position information acquisition unit 182 and the current date/time measured by the time information acquisition unit 181 (step S164).

The movement pattern extraction unit 187 determines whether or not the straight-line distance from the reference position to the current position is equal to or greater than a prescribed distance threshold value (step S165).

If the straight-line distance is determined to be less than the distance threshold value (step S165: NO), then the process returns to step S164.

On the other hand, if the straight-line distance is determined to be equal to or greater than the distance threshold value (step S165: YES), then the movement pattern extraction unit 187 determines whether or not the elapsed time period from the reference date/time to the current date/time is equal to or greater than the prescribed time period threshold value (step S166).

If it is determined that the elapsed time period is equal to or greater than the time period threshold value (step S166: YES), then the movement pattern extraction unit 187 adds a resting label to the user position information stored in the user position information storage unit 171 (step S171).

In this case, the elapsed time period from the reference date/time to the current date/time is relatively long. Therefore, the amount of movement of the wireless terminal detection device 100 per unit time is relatively small (i.e., the average movement speed of the wireless terminal detection device 100 is relatively slow). Therefore, the movement pattern extraction unit 187 determines that the wireless terminal detection device 100 is resting and a process for the case of resting is performed.

Specifically, in step S171, the movement pattern extraction unit 187 writes the value of the resting label variable into the "Moving/Resting" column in the rows of the user position information stored in the user position information storage unit 171, from the row in which the measurement date/time is the reference date/time to the row immediately before the row in which the measurement date/time is the current date/time obtained in step S164. Regarding the row in which the measurement date/time is the current date/time obtained in step S164, the next determination is considered to apply thereto, and at this time, a resting label is not added to the corresponding row in the user position information.

After step S171, the movement pattern extraction unit 187 determines whether or not the value of the moving/resting flag is "moving" (step S172).

If the value of the moving flag is determined to be "moving" (step S172: YES), then the movement pattern extraction unit 187 updates the value of the moving/resting flag to "resting" (step S173) and increments the serial number (serial number value of the moving label variable) of the moving label by one (step S174).

In this case, the state of the wireless terminal detection device 100 is transitioning from moving to resting. Thus, the movement pattern extraction unit 187 changes the value of the moving/resting flag. Additionally, the moving state has ended. Thus, the movement pattern extraction unit 187 increments the serial number of the moving label in preparation for the next moving state.

After step S174, the process returns to step S163.

On the other hand, if the movement pattern extraction unit 187 has determined that the value of the moving flag is "resting" in step S172 (step S172: NO), then the process returns to step S163.

In this case, the moving state is maintained, and there is no switch between moving and resting at this timing. For this reason, the value of the moving/resting flag is not switched and the serial number of the moving label is not incremented.

On the other hand, if the elapsed time period is determined to be less than the time period threshold value in step S166 (step S166: NO), then the movement pattern extraction unit 187 adds a moving label to the user position information stored in the user position information storage unit 171 (step S171).

In this case, the elapsed time period from the reference date/time to the current date/time is relatively short. Therefore, the amount of movement of the wireless terminal detection device 100 per unit time is relatively large (i.e., the average movement speed of the wireless terminal detection device 100 is relatively fast). Therefore, the movement pattern extraction unit 187 determines that the wireless terminal detection device 100 is moving and a process for the case of moving is performed.

Specifically, in step S181, the movement pattern extraction unit 187 writes the value of the moving label variable into the "Moving/Resting" column in the rows of the user position information stored in the user position information storage unit 171, from the row in which the measurement date/time is the reference date/time to the row immediately before the row in which the measurement date/time is the current date/time obtained in step S164. In step S181, as in the case of step S171, for the row in which the measurement date/time is the current date/time obtained in step S164, the next determination is considered to apply thereto, and at this time, a moving label is not added to the corresponding row in the user position information.

After step S181, the movement pattern extraction unit 187 determines whether or not the value of the moving/resting flag is "resting" (step S182).

If the value of the moving flag is determined to be "resting" (step S182: YES), then the movement pattern extraction unit 187 updates the value of the moving/resting flag to "moving" (step S183) and increments the serial number (serial number value of the resting label variable) of the resting label by one (step S184).

In this case, the state of the wireless terminal detection device 100 is transitioning from resting to moving. Thus, the movement pattern extraction unit 187 changes the value of the moving/resting flag. Additionally, the resting state has ended. Thus, the movement pattern extraction unit 187 increments the serial number of the resting label in preparation for the next resting state.

After step S184, the process returns to step S163.

On the other hand, if the movement pattern extraction unit 187 has determined that the value of the moving flag is "resting" in step S182 (step S182: NO), then the process returns to step S163.

In this case, the resting state is maintained, and there is no switch between resting and moving at this timing. For this reason, the value of the moving/resting flag is not switched and the serial number of the resting label is not incremented.

FIG. 8 is a flow chart indicating an example of a processing procedure by which the pattern classification unit 188 determines a movement pattern of a user. The pattern classification unit 188 performs the process of FIG. 8 in step S113 in FIG. 5.

Alternatively, the wireless terminal detection device 100 may perform the process of FIG. 5 and the process of FIG. 8 in parallel. In this case, the pattern classification unit 188 periodically and repeatedly performs the process of FIG. 8 such as, for example, by executing the process of FIG. 8 at a prescribed time every day. Additionally, in this case, there is no need to provide a processing step for the process of FIG. 8 within the process of FIG. 5. Therefore, step S113 is omitted.

In the process in FIG. 8, the pattern classification unit 188 reads multiple days of user position information from the user position information storage unit 171 (step S211).

Furthermore, the pattern classification unit 188 classifies the data of the user position information that has been read out on the basis of the similarity of times and positions (step S212). For example, the pattern classification unit 188 classifies, as the classification target, data obtained by dividing the user position information that has been read out between rows at which there is a switch between resting and moving.

FIG. 9 is a diagram indicating an example of cutout of data that is classified by the pattern classification unit 188. FIG. 9 indicates an example of user position information, in which the higher rows indicate older measurement dates/times and the lower rows indicate newer dates/times.

In the example in FIG. 9, the resting/moving label switches from "resting 1" to "moving 1" at line L111. Additionally, the resting/moving label switches from "moving 1" to "resting 2" at line L112. The resting/moving label switches from "resting 2" to "moving 2" at line L113. Above line L111, the resting/moving label in all of the rows is "resting 1". From line L111 to line L112, the resting/moving label is "moving 1" in all of the rows. Between line L112 and line L113, the resting/moving label is "resting 2" in all of the rows.

The pattern classification unit 188 extracts, from among the user position information, blocks of rows to which the same resting/moving labels are appended, as in the portion above line L111, the portion from line L111 to line L112, and the portion from line L112 to line L113, and divides the extracted data into classes. These blocks of rows correspond to examples of movement patterns.

Since the movement pattern extraction unit 187 resets the resting/moving labels daily, the same resting/moving labels, such as "resting 1", are used on different dates. The pattern classification unit 188 performs the classification by treating labels having the same information due to these resets as different labels.

After step S212, the pattern classification unit 188 starts loop L11 for processing the classification results from step S212 separately by class (step S213). The classes that are to be processed in loop L11 are also referred to as target classes.

In a process for loop L21, the pattern classification unit 188 determines whether or not the number of elements in a target class (number of items of data classified in the target class) is equal to or greater than a prescribed number (step S221).

If the number of elements is determined to be equal to or greater than a number threshold value (step S221: YES), then the pattern classification unit 188 determines that the movement pattern of the user is an ordinary state for all of the elements classified in that class, and adds an ordinary label to the user position information stored in the user position information storage unit 171 (step S231). Specifically, the pattern classification unit 188 writes "ordinary" in the "Ordinary/Non-ordinary" column in the row corresponding to each row included in the elements in the target class among the rows in the user position information stored in the user position information storage unit 171.

After step S231, the pattern classification unit 188 performs a termination process for loop L11 (step S251). Specifically, the pattern classification unit 188 determines whether or not the process of loop L11 has been completed for all of the classes obtained by the classification in step S212. If it is determined that there is an unprocessed class, then the pattern classification unit 188 subsequently performs the process of loop L11, from step S213, on the unprocessed class. On the other hand, if it is determined that the process of loop L11 has been completed for all of the classes, then the pattern classification unit 188 ends the process of loop L11. In this case, the wireless terminal detection device 100 ends the process in FIG. 8 and returns to the process in FIG. 5.

On the other hand, if it is determined that the number of elements is less than the number threshold value in step S221 (step S221: NO), then the pattern classification unit 188 determines that the movement pattern of the user is a non-ordinary state for all of the elements classified in that class, and adds a non-ordinary label to the user position information stored in the user position information storage unit 171 (step S241). Specifically, the pattern classification unit 188 writes "non-ordinary" in the "Ordinary/Non-ordinary" column in the row corresponding to each row included in the elements in the target class among the rows in the user position information stored in the user position information storage unit 171.

After step S241, the process advances to step S251.

As described above, the user position information acquisition unit 182 measures the position of the wireless terminal detection device 100. The pattern classification unit 188 classifies movement patterns that are extracted from position history information of the wireless terminal detection device 100 into ordinary patterns and non-ordinary patterns based on classification results in which the movement patterns are classified in accordance with times and positions. The suspicious terminal analysis unit 190 determines whether or not the user need to be notified of a mobile terminal device 901 that is a transmission source of radio waves received by the wireless terminal detection device 100 based on the reception history of radio waves from that mobile terminal device 901 during time intervals classified as non-ordinary patterns. The notification unit 130 notifies the user when it is determined that a notification to the user is necessary.

As a result thereof, the wireless terminal detection device 100 can determine whether or not notification to the user is required by using not only radio waves that are detected at the same location every time, but also by using information regarding whether the movement pattern of the user at the time the radio waves were received was an ordinary pattern or a non-ordinary pattern.

For example, if a user commutes to multiple different locations, such as a main office and branch offices, depending on the day, then under a determination standard based simply on whether or not the radio waves are detected at the same location each time, the user might be notified that the mobile terminal device 901 of a coworker who commutes to the same multiple locations as the user is a suspicious mobile terminal device 901. However, a notification that (the mobile terminal device 901 of) a coworker has been detected can normally be considered to be unnecessary for a user, and receiving such unnecessary notifications places a burden on the user.

In contrast therewith, the wireless terminal detection device 100 can prevent situations in which the user is notified that a mobile terminal device 901 of a coworker who commutes to the same multiple locations as the user is a suspicious mobile terminal device 901 by classifying all of the user's commutes to the different locations as ordinary patterns.

Additionally, the suspicious terminal analysis unit 190 determines whether or not notification to the user is required based on the number of days that the wireless terminal detection device 100 has received radio waves from a mobile terminal device 901 that is a determination target.

In this case, even if the movement of the user and the movement of another person happen to be similar by chance and the wireless terminal detection device 100 has detected radio waves from the mobile terminal device 901 of the other person several times, there is a low possibility that the other person is a suspicious person if the other person does not approach the user repeatedly on different days. In this case, it can be considered to be appropriate not to notify the user.

According to the wireless terminal detection device 100, by determining whether or not a notification is necessary based on the number of days that the wireless terminal detection device 100 has received the radio waves, notifications can be suppressed in the case in which the other person does not approach the user repeatedly on different days.

Additionally, the suspicious terminal analysis unit 190 determines whether or not notification to the user is required based on the cumulative time period during which the wireless terminal detection device 100 has received radio waves from a mobile terminal device 901 that is a determination target.

In this case, if the user and another person have simply passed by each other several times, then there is a low possibility that the other person is a suspicious person, and it can be considered to be appropriate not to notify the user.

According to the wireless terminal detection device 100, whether or not a notification is necessary is determined based on the cumulative time period during which the wireless terminal detection device 100 has received radio waves. As a result thereof, it can be determined whether or not the user and another person have simply passed each other, or the other person has been near the user for a long time. As a result thereof, the wireless terminal detection device 100 can suppress notifications in the case in which the user and another person have simply passed each other several times.

Additionally, the movement pattern extraction unit 187 determines, based on the user position information (position history information of the wireless terminal detection device 100) whether the wireless terminal detection device 100 was moving or resting at the date/time of position measurement indicated in the history information. Furthermore, the movement pattern extraction unit 187 extracts, as time intervals of individual movement patterns, respectively, time intervals from when the wireless terminal detection device 100 starts moving until the moving ends and time intervals from when the wireless terminal detection device 100 starts resting until the resting ends.

As a result thereof, the wireless terminal detection device 100 can automatically extract user position information from the user movement patterns, and there is no need for the user to register the user's own movement patterns. According to the wireless terminal detection device 100, the burden to the user can be kept small due to this feature.

Second Embodiment

The configuration of the mobile terminal device according to the second embodiment is the same as that in FIG. 1. Thus, FIG. 1 will also be used to explain the second embodiment.

In the second embodiment, the method by which the ordinary state determination unit 186 classifies user movement patterns and the method by which the suspicious terminal analysis unit 190 determines whether or not the mobile terminal device 901 is a suspicious terminal differ from those in the case of the first embodiment.

Specifically, the suspicious terminal analysis unit 190 determines whether or not a mobile terminal device 901 is a suspicious terminal by using the detection conditions of the mobile terminal device 901 at ordinary times in addition to the detection conditions of the mobile terminal device 901 at non-ordinary times.

Additionally, the ordinary state determination unit 186 further classifies the movement patterns of the user in the ordinary state into sub-classes based on at least one of time, day of the week, location, rest time period, and distinction between moving or resting regarding the movement patterns in the ordinary state. In conjunction therewith, the suspicious terminal analysis unit 190 determines whether or not notification to the user is required based on the reception history of radio waves from the mobile terminal devices 901 in time intervals classified into the sub-classes.

Otherwise, the wireless terminal detection device 100 according to the second embodiment is similar to the wireless terminal detection device 100 in the case of the first embodiment.

The ordinary state determination unit 186, as mentioned above, classifies the movement patterns of the user into ordinary states and non-ordinary states, and further classifies the ordinary states into sub-classes based on at least one of time, day of the week, location, rest time period, and distinction between moving or resting.

Regarding the location classification, the ordinary state determination unit 186 further classifies, into multiple sub-classes, the movement patterns that have been classified in the ordinary state. An example of the case in which the positions of locations often visited by the user, such as home, workplace, regularly visited bars, regularly visited sports clubs, and the like, are pre-registered will be explained. In this case, the ordinary state determination unit 186 may use registered position information to classify the movement patterns of the user into sub-classes such as "at home", "commuting", "working", "regularly visited bar", "sports club", and the like.

Alternatively, the ordinary state determination unit 186 may determine whether two locations are the same or different, and classify the locations into sub-classes to which labels are added for each location that is determined to be a different location, such as "location 1", "location 2", and "moving from location 1 to location 2". In this case, it is unnecessary to pre-register locations often visited by the user.

In the case of resting movement patterns, the ordinary state determination unit 186 determines whether or not the positions at which the user is resting indicate the same location, and classifies movement patterns that have been determined to be the same in the same sub-group.

In the case of moving movement patterns, the ordinary state determination unit 186 determines whether or not the starting positions and the ending positions of the movement are each the same. Then, the normal state determination unit 186 classifies movement patterns in which each of the positions have been determined to be the same into the same sub-group, and classifies movement patterns in which either one of the positions are different into separate sub-groups. In this case, if the distance between positions in two movement patterns is equal to or less than a prescribed threshold value, then the ordinary state determination unit 186 determines that the positions are the same.

Furthermore, the ordinary state determination unit 186 sets midpoints in the movement patterns and determines whether or not the positions of the midpoints are the same in addition to the movement starting positions and ending positions. Then, the normal state determination unit 186 classifies movement patterns in which each of the positions have been determined to be the same into the same sub-group, and classifies movement patterns in which any of the positions are different into separate sub-groups.

The method by which the suspicious terminal analysis unit 190 determines whether or not a mobile terminal device 901 is a suspicious terminal is not limited to a specific method. For example, the suspicious terminal analysis unit 190 may compute a degree of suspiciousness based on the number of days that the identification information of a determination target has been detected in the ordinary state and the non-ordinary state respectively, and may determine whether or not the determination target is a suspicious terminal based on the degree of suspiciousness. Furthermore, for example, the suspicious terminal analysis unit 190 may compare the computed degree of suspiciousness with a prescribed threshold value, and may determine that the mobile terminal device 901 that is the determination target is a suspicious terminal if the degree of suspiciousness is determined to be greater than the threshold value.

Alternatively, the suspicious terminal analysis unit 190 may determine whether or not a determination target is a suspicious terminal based on the individual lengths of time that the identification information of the determination target has been detected in the ordinary state and in the non-ordinary state, respectively. For example, the suspicious terminal analysis unit 190 may determine a mobile terminal device 901 that is a radio wave transmission source to be a suspicious terminal in the case in which the longest of the lengths of time that are detected is greater than a threshold value. Alternatively, the suspicious terminal analysis unit 190 may determine whether or not a determination target is a suspicious terminal based on the cumulative time period during which the identification information of the determination target has been detected in the ordinary state and in the non-ordinary state, respectively.

Alternatively, the suspicious terminal analysis unit 190 may count the numbers of the different movement state labels among the identification information of a determination target detected respectively in the ordinary state and the non-ordinary state. Then, the suspicious terminal analysis unit 190 may determine that the determination target is a suspicious terminal if the number of counted labels in the different movement states is equal to or greater than a prescribed threshold value. For example, if the identification information of a determination target is detected in "resting 1", "moving 2", and "resting 3", then the suspicious terminal analysis unit 190 counts the number of labels as 3, and compares the number of counted labels with a threshold value.

The suspicious terminal analysis unit 190 may determine whether or not a determination target is a suspicious terminal by each of multiple determination methods and may notify the user of the respective determination results by means of the notification unit 130.

The suspicious terminal analysis unit 190, for example, computes a degree of suspiciousness h based on Expression (1), and if the degree of suspiciousness h is equal to or higher than a prescribed threshold value, then the user is notified, by means of the notification unit 130, that a suspicious terminal has been detected.

[Mathematical Expression 1]

$$h=(N_a,N_b)=C_aN_a+C_bN_b \quad (1)$$

The value "$N_a$" in Expression (1) indicates the number of times of detection in the ordinary state. The value "$N_b$" in Expression (1) indicates the number of times of detection in the non-ordinary state. In this case, the number of times of detection is the number of times that the nearby conditions detection unit 183 has detected radio waves from a mobile terminal device 901 that is a determination target. Alternatively, instead of the number of times of detection, the above-mentioned number of days, lengths of time, cumulative time period, or number of different movement state labels may be used.

In Expression (1), f is a function taking, as an input, the number of times of detection of the mobile terminal device 901 that is the determination target, and outputting the degree of suspiciousness. In Expression (1), $f(N_a, N_b)=C_aN_a+C_bN_b$.

The values $C_a$ and $C_b$ in Expression (1) are both coefficients, where $C_a<C_b$.

For example, the values may be set so that $0<C_a<C_b$. In this case, for example, mobile terminal devices 901 that are detected in movement patterns during both ordinary times and non-ordinary times for the user, such as the mobile terminal device 901 of a stalker who frequently appears near the user's home and, furthermore, persistently follows the user while the user is shopping, can be determined to be suspicious terminals. Additionally, since $C_a<C_b$, it is possible to avoid determining, as being a suspicious terminal, a mobile terminal device 901 that is detected in movement patterns during ordinary times for the user, yet that is not often detected in movement patterns during non-ordinary times, such as that of a coworker at the same workplace.

Alternatively, the values may be set so that $C_a<0<C_b$. In this case, for example, mobile terminal devices 901 that are detected in movement patterns during non-ordinary times for the user and that are not often detected in movement patterns during ordinary times, such as the mobile terminal device 901 of a stalker who persistently follows the user while the user is out during days off, can be determined to be suspicious terminals. Additionally, since $C_a<0<C_b$, it is possible to avoid determining, as being a suspicious terminal, a mobile terminal device 901 that is detected in movement patterns during both ordinary times and non-ordinary times of the user, such as that of a coworker at the same workplace who also often moves together with the user after work.

Regarding the value of $N_a$ in Expression (1), the value of $N_a$ may be set to be "1" if radio waves from a mobile terminal device 901 that is a determination target are detected in the ordinary state during a specific period, regardless of the number of times of detection, and the value of $N_a$ may be set to be "0" if radio waves are not detected.

Additionally, the number of sub-classes in which radio waves from a mobile terminal device 901 that is a determination target are detected in the ordinary state may be used as the value of $N_a$ in Expression (1). For example, if location sub-classes are provided, then the determination as to whether or not a determination target is a suspicious terminal may be performed based on the diversity of locations (the number of locations of detection) in which the radio waves from the mobile terminal device 901 that is the determination target have been detected.

Additionally, the notification unit 130 may notify the user of identification information of mobile terminal devices 901 detected in both the ordinary state and the non-ordinary state, the number of times the mobile terminal devices 901 were detected in the non-ordinary state, and the number of sub-classes in which the mobile terminal devices 901 were detected in the ordinary state.

In the case in which the ordinary state determination unit 186 further classifies the ordinary states into sub-classes, the suspicious terminal analysis unit 190 may compute the degree of suspiciousness h based on Expression (2).

[Mathematical Expression 2]

$$h=f(N_{a1},N_{a2},\ldots,N_{am}N_b)=C_aN_a+C_bN_b \quad (2)$$

The values $N_{a1}, N_{a2}, \ldots, N_{am}$ in Expression (2) indicate the number of times of detection in each sub-class. The value m indicates the number of sub-classes. As in the case of Expression (1), $N_b$ indicates the number of times of detection in the non-ordinary state. In this case, the number of times of detection is the number of times that the nearby conditions detection unit 183 has detected radio waves from a mobile terminal device 901 that is a detection target. Alternatively, instead of the number of times of detection, the above-mentioned number of days, lengths of time, cumulative time period, or number of different movement state labels may be used.

In Expression (2), f is a function taking, as an input, the number of times of detection of a mobile terminal device 901 that is a determination target, and outputting the degree of suspiciousness. In Expression (2), $f(N_{a1}, N_{a2}, \ldots, N_{am})=C_aN_a+C_bN_b$.

The values $C_{a1}, C_{a2}, \ldots, C_{am}, C_b$ are all coefficients, where $C_{a1}<C_b, C_{a2}<C_b, \ldots, C_{am}<C_b$.

The values of the coefficients $C_{a1}, C_{a2}, \ldots, C_{am}$ may be defined in accordance with the number of movement patterns classified in the respective sub-classes. For example, by setting the value of the coefficient to be larger for sub-classes in which the number of movement patterns classified therein are fewer, the degree of suspiciousness h can be computed by paying more attention to movement patterns that are not very frequent (therefore, movement patterns that are relatively close to being non-ordinary) among the movement patterns of ordinary times.

Next, the operations of the wireless terminal detection device 100 according to the second embodiment will be explained by referring to FIG. 10 and FIG. 11.

Figure 10:
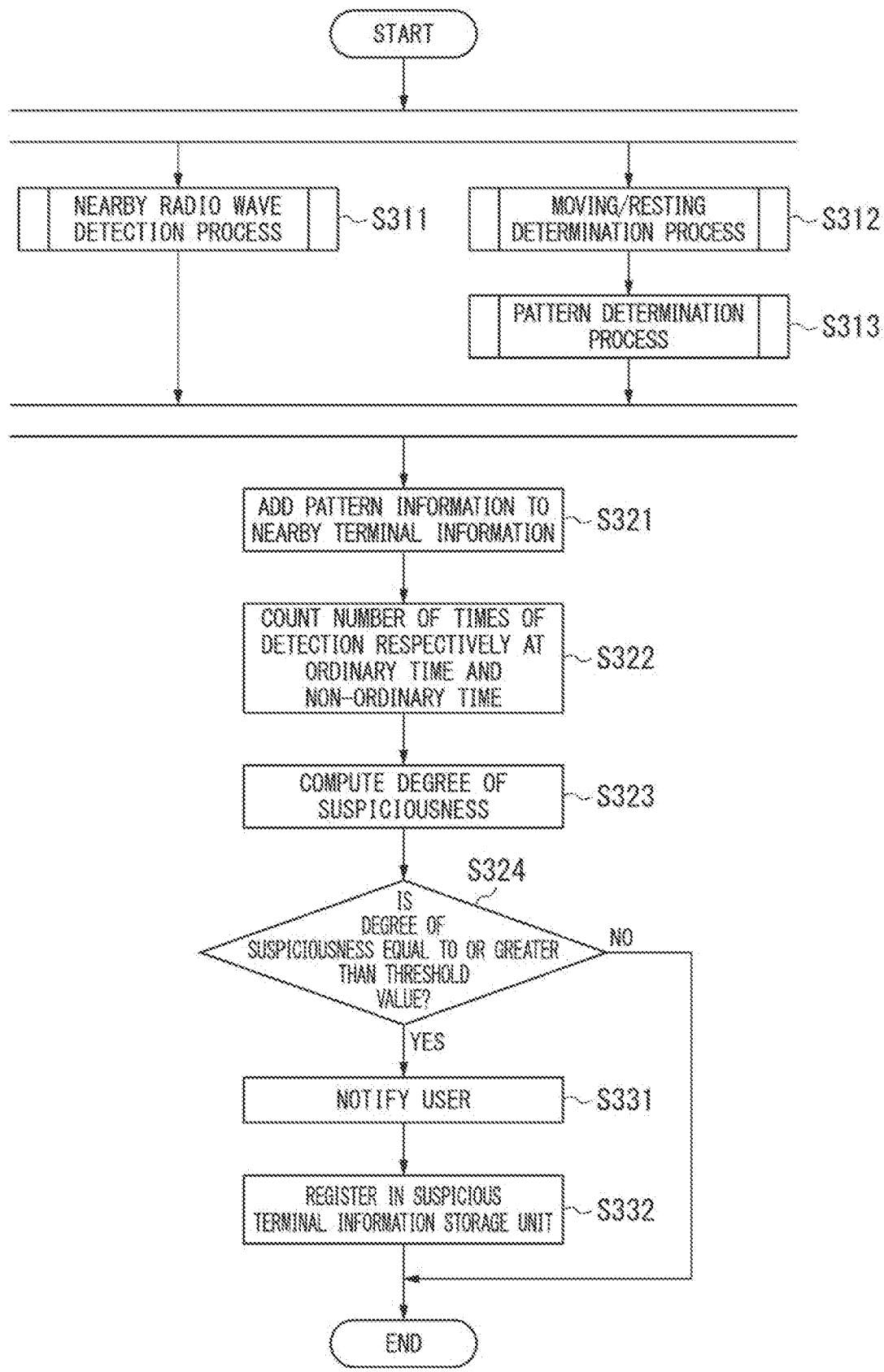
FIG. 10 is a flow chart indicating an example of a processing procedure performed by a wireless terminal detection device according to a second embodiment.

FIG. 10 is a flow chart indicating an example of a processing procedure performed by the wireless terminal detection device 100 according to the second embodiment. The wireless terminal detection device 100 repeatedly performs the process in FIG. 10 in order to continually monitor the radio waves from mobile terminal devices 901.

Steps S311 and S312 in FIG. 10 are the same as steps S111 and S112 in FIG. 5.

After step S312, the pattern classification unit 188 determines a movement pattern of the user and adds a label indicating the determination result to the user position information (step S313). In step S313, the pattern classification unit 188 classifies the movement pattern of the user into an ordinary state or a non-ordinary state, and further classifies a movement pattern classified into an ordinary state.

After steps S311 and S313, the linking unit 189 adds, to the elements of the nearby terminal information stored in the nearby terminal information storage unit 172, a label indicating an ordinary state or a non-ordinary state, and a label for a sub-class into which a movement pattern in an ordinary state has been classified (step S321).

Next, the suspicious terminal analysis unit 190 references the nearby terminal information stored in the nearby terminal information storage unit 172 for each mobile terminal device 901 that is a radio wave transmission source. Then, the suspicious terminal analysis unit 190 counts the number of times of detection of radio waves received from the mobile terminal device 901 in each of ordinary states and non-ordinary states (step S322). The suspicious terminal analysis unit 190 counts the number of times of detection in each sub-class when counting the number of times of detection of the radio waves received in the ordinary state.

Furthermore, the suspicious terminal analysis unit 190 computes the degree of suspiciousness of the mobile terminal device 901 based on the number of times of detection that have been counted (step S323) and determines whether or not the computed degree of suspiciousness is equal to or greater than a threshold value (step S324).

If it is determined that the degree of suspiciousness is equal to or greater than the threshold value (step S324: YES), then the suspicious terminal analysis unit 190 performs the process in steps S331 and S332. Steps S331 and S332 are the same as steps S131 and S132 in FIG. 5.

After the process in step S332, the wireless terminal detection device 100 ends the process in FIG. 10.

On the other hand, if the suspicious terminal analysis unit 190 determines that the degree of suspiciousness is lower than the threshold value in step S324 (step S324: NO), then the wireless terminal detection device 100 ends the process in FIG. 10. Therefore, in this case, the wireless terminal detection device 100 does not notify the user that a suspicious terminal has been detected and does not register suspicious terminal information.

Figure 11:
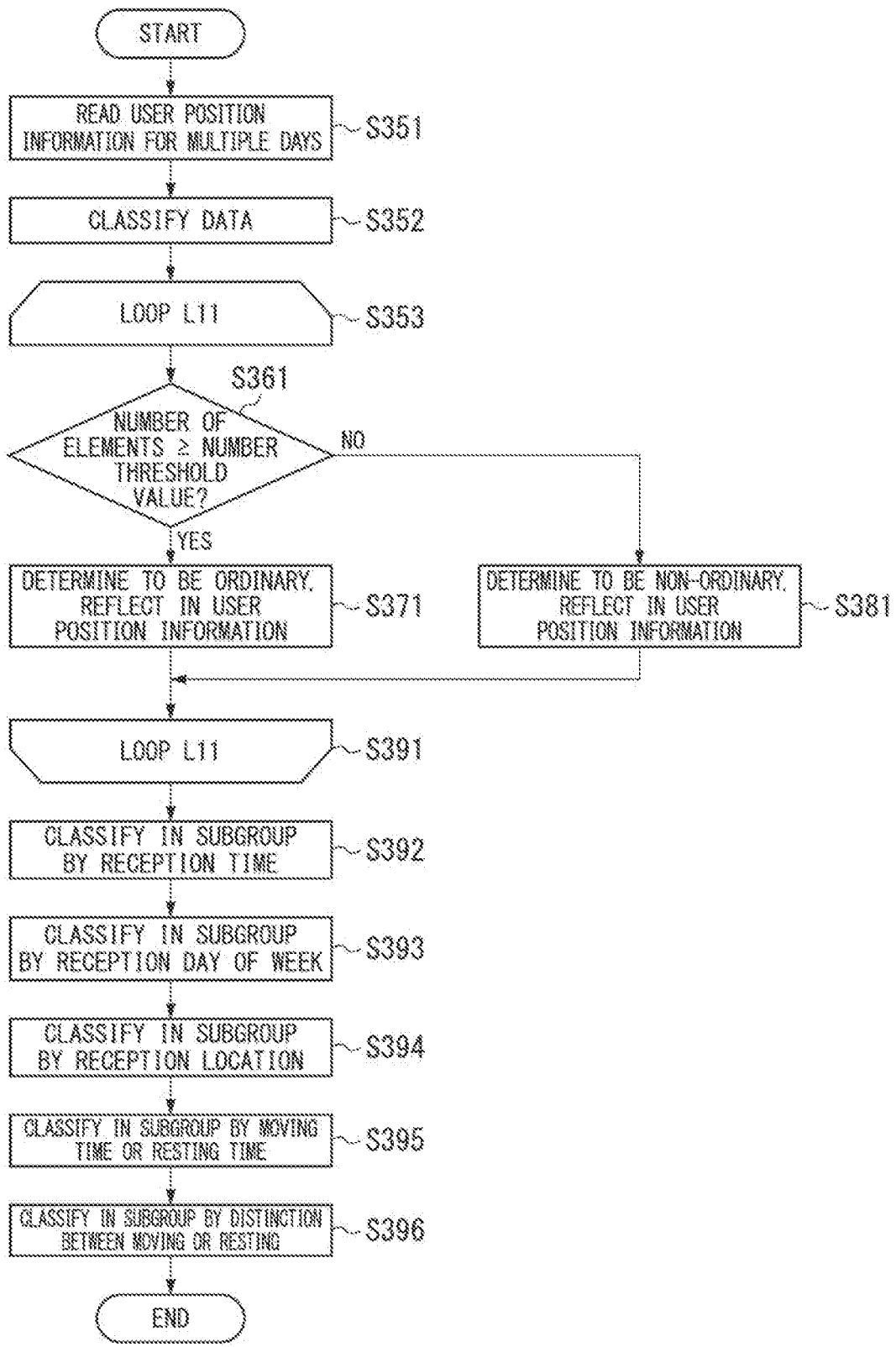
FIG. 11 is a flow chart indicating an example of a processing procedure by which a pattern classification unit according to the second embodiment determines a movement pattern of a user.

FIG. 11 is a flow chart indicating an example of a processing procedure by which the pattern classification unit 188 determines a movement pattern of the user. The pattern classification unit 188 performs the process of FIG. 11 in step S313 in FIG. 10.

Alternatively, the wireless terminal detection device 100 may perform the process of FIG. 10 and the process of FIG. 11 in parallel. In this case, the pattern classification unit 188 periodically and repeatedly performs the process of FIG. 11 such as, for example, by executing the process of FIG. 11 at a prescribed time every day. Additionally, in this case, there is no need to provide a processing step for the process of FIG. 11 within the process of FIG. 10. Therefore, step S313 is omitted.

Steps S351 to S391 in FIG. 11 are the same as steps S211 to S251 in FIG. 8.

If the process of loop L11 has ended at step S391, then the pattern classification unit 188 further classifies a movement pattern that has been classified as an ordinary pattern into a sub-group in accordance with the reception time (step S392).

Additionally, the pattern classification unit 188 further classifies a movement pattern that has been classified as an ordinary pattern into a sub-group in accordance with the day of the week of reception (step S393).

Additionally, the pattern classification unit 188 further classifies a movement pattern that has been classified as an ordinary pattern into a sub-group in accordance with the location of reception (step S394).

Additionally, the pattern classification unit 188 further classifies a movement pattern that has been classified as an ordinary pattern into a sub-group in accordance with a moving time period or a resting time period (step S395). The pattern classification unit 188 classifies movement patterns that have been classified as moving into a sub-group in accordance with the moving time period. Additionally, the pattern classification unit 188 classifies movement patterns that have been classified as resting into a sub-group in accordance with the resting time period.

Additionally, the pattern classification unit 188 further classifies a movement pattern that has been classified as an ordinary pattern into a sub-group in accordance with the distinction between moving and resting (step S396).

After step S396, the wireless terminal detection device 100 ends the process in FIG. 11 and returns to the process in FIG. 10.

The pattern classification unit 188 may perform just some of the processes among the processes in steps S392 to S396. For example, the pattern classification unit 188 may perform only the process of step S392 among the processes in steps S392 to S396.

As described above, the suspicious terminal analysis unit 190 determines whether or not notification to the user is required based on the reception history of radio waves from a transmission-side wireless terminal in time intervals classified as ordinary patterns in addition to the reception history of radio waves from the transmission-side wireless terminal in time intervals classified as non-ordinary patterns.

As a result thereof, the wireless terminal detection device 100 can more accurately determine whether or not a determination target is a suspicious terminal. For example, as in the example described above, the relationship between the detection conditions of movement patterns during ordinary times and the detection conditions of movement patterns in non-ordinary states can be reflected in the determination of suspicious terminals.

Additionally, the pattern classification unit 188 further classifies the movement patterns in the ordinary states into sub-classes based on at least one of time, day of the week, location, rest time period, and distinction between moving or resting. The suspicious terminal analysis unit 190 determines whether or not notification to the user is required based on the reception history of radio waves from the transmission-side wireless terminals in time intervals classified into sub-classes.

As a result thereof, the wireless terminal detection device 100 can determine whether or not a determination target is a suspicious terminal with higher accuracy. For example, in the example described above, degrees of contribution (weightings) can be set for determining suspicious terminals in accordance with the sub-classes.

Third Embodiment

Figure 12:
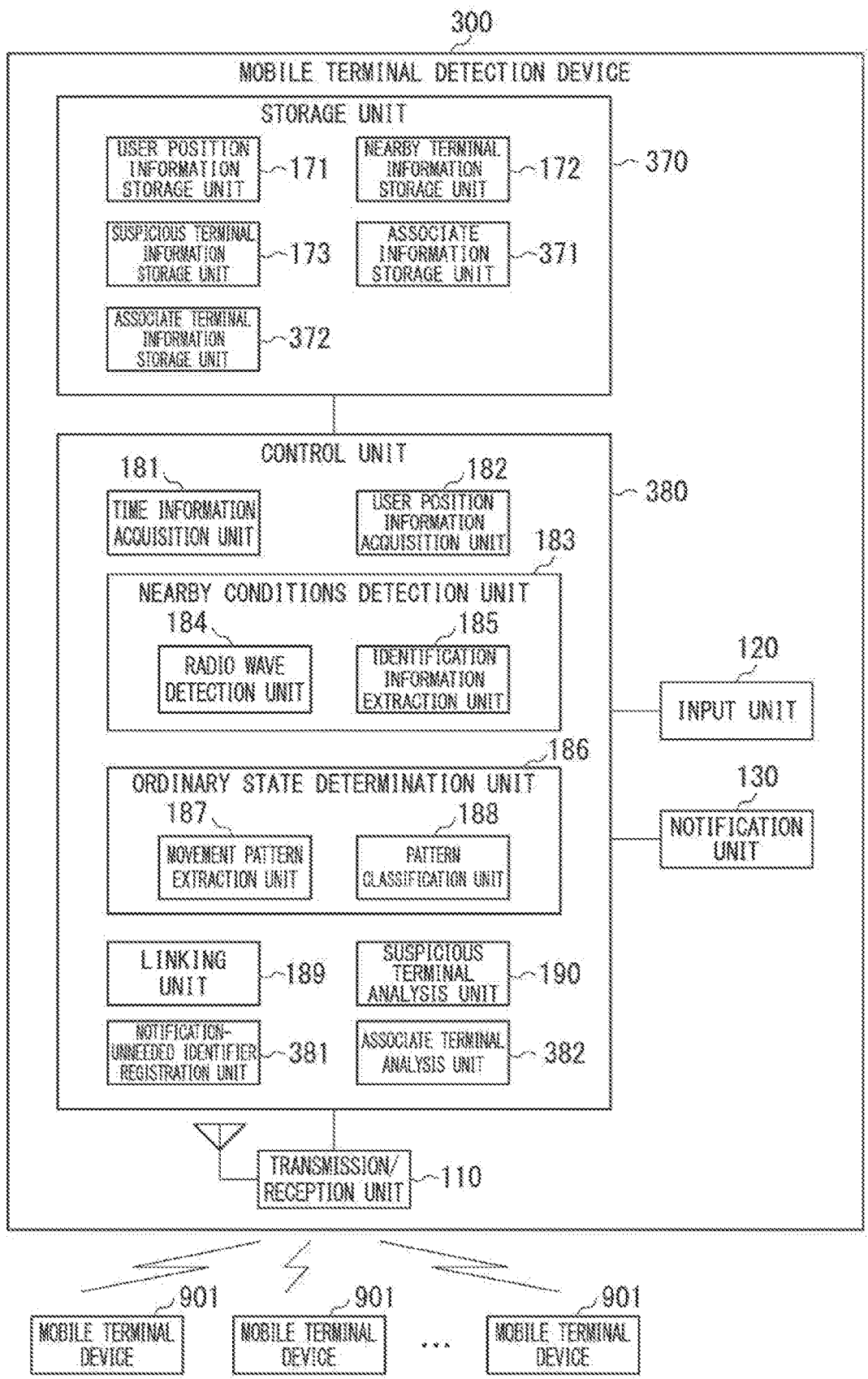
FIG. 12 is a schematic block diagram indicating a functional configuration of a wireless terminal detection device according to a third embodiment.

FIG. 12 is a schematic block diagram indicating the functional configuration of a mobile terminal device according to the third embodiment. In the configuration indicated in FIG. 12, a wireless terminal detection device 300 comprises a transmission/reception unit 110, an input unit 120, a notification unit 130, a storage unit 370, and a control unit 380. The storage unit 370 comprises a user position information storage unit 171, a nearby terminal information storage unit 172, a suspicious terminal information storage unit 173, an associate information storage unit 371, and an associate terminal information storage unit 372. The control unit 380 comprises a time information acquisition unit 181, a user position information acquisition unit 182, a nearby conditions detection unit 183, an ordinary state determination unit 186, a linking unit 189, a suspicious terminal analysis unit 190, an associate information registration unit 381, and an associate terminal analysis unit 382. The nearby conditions detection unit 183 comprises a radio wave detection unit 184 and an identification information extraction unit 185. The ordinary state determination unit 186 comprises a movement pattern extraction unit 187 and a pattern classification unit 188.

The respective units in FIG. 12 corresponding to units in FIG. 1 and having similar functions thereto are assigned the same reference numbers (110, 120, 130, 171 to 173 and 181 to 190), and their descriptions are omitted.

The wireless terminal detection device 300 differs from the wireless terminal detection device 100 (FIG. 1) in that the storage unit 370 comprises an associate information storage unit 371 and an associate terminal information storage unit 372, and in that the control unit 380 comprises an associate information registration unit 381 and an associate terminal analysis unit 382. Otherwise, the wireless terminal detection device 300 is the same as the wireless terminal detection device 100.

The associate information storage unit 371 stores associate information. The associates mentioned here are people that the user wishes to exclude from being suspicious person detection targets. The associate information mentioned here is information for the wireless terminal detection device 300 to identify the mobile terminal devices 901 of associates.

FIG. 13 is a diagram indicating an example of the data structure of the associate information stored in the associate information storage unit 371. In the example in FIG. 13, the associate information is configured as data in table form.

Additionally, in the example in FIG. 13, the associate information is configured so as to include the categories "Starting date/time", "Ending date/time" and "Associate name".

The "Starting date/time" column and the "Ending date/time" column contain the starting dates/times and the ending dates/times for detection periods of radio waves from the mobile terminal devices 901 of associates. The starting dates/times and the ending dates/times are, for example, designated by the user. Mobile terminal devices 901 from which radio waves of prescribed conditions or greater are detected during these detection periods are registered in the associate terminal information as associate mobile terminal devices 901.

The degree of specificity by which the associate information storage unit 371 designates the starting dates/times and the ending dates/times is not limited to the degree of specificity down to units of minutes indicated in FIG. 13. For example, the associate information storage unit 371 may store the starting dates/times and the ending dates/times at a degree of specificity that is less specific than minutes, such as by storing the starting dates/times and the ending dates/times down to units of hours. Alternatively, the associate information storage unit 371 may store the starting dates/times and the ending dates/times in units more specific than minutes, such as by storing the starting dates/times and the ending dates/times down to units of seconds.

The "Associate name" column contains names indicating the associates who are carriers of the mobile terminal devices 901 detected based on the associate information. In this case, the names of the associates are not particularly limited as long as they are for allowing a user to recognize associates. For example, the names of the associates may indicate groups in which the associates are classified, such as "family" or "coworker". Alternatively, the names of the associates may individually identify associates, such as by the personal names of the associates. The names of the associates are designated, for example, by the user.

However, the names of the associates are not essential.

The associate terminal information storage unit 372 stores associate terminal information. The associate terminal information mentioned here is information regarding mobile terminal devices 901 specified as being associates' mobile terminal devices 901. The associate identification information includes identification information for identifying the radio waves from the associates' mobile terminal devices 901. For example, nearby terminal information of a mobile terminal device 901 specified as being an associate's mobile terminal device 901 may be stored as the associate terminal information. In this case, the associate terminal information storage unit 372 may store, as the associate terminal information, a link to the nearby terminal information of a mobile terminal device 901 that has been specified as being an associate's mobile terminal device 901. For example, the associate terminal information storage unit 372 may store as the associate terminal information, so as to be linked with each other, the names of associates and links to the nearby terminal information of mobile terminal devices 901 detected as being the associates' mobile terminal devices 901.

The associate information registration unit 381 generates associate information based on a notification from a user, and registers the associate information in the associate information storage unit 371. For example, a user may perform user operations on the input unit 120 for inputting the name of an associate, and may further perform user operations on the input unit 120 for indicating the timings, respectively, of the starting time and the ending time of a designated period. The associate information registration unit 381 acquires, as the starting date/time and the ending date/time, the current date/time output by the time information acquisition unit 181 at the timings at which user operations were performed.

Alternatively, the user may perform user operations on the input unit 20 for inputting date/time information indicating, respectively, the starting date/time and the ending date/time of the designated period. In this case, the input of the associate's name, the starting date/time, and the ending date/time by the user may be performed before the period, during the period, or after the period designated by the starting date/time and the ending date/time.

The associate information registration unit 381 generates associate information containing the names of associates, the starting dates/times and the ending dates/times as in the example in FIG. 13, and stores the associate information in the associate information storage unit 371.

The associate terminal analysis unit 382 registers, as associate terminals in the associate terminal information storage unit 372, mobile terminal devices 901 that are radio wave transmission sources from which the reception of radio waves has been detected by the wireless terminal detection device 300 with a frequency that is equal to or greater than a prescribed frequency within the designated periods. The associate terminals mentioned here are mobile terminal devices 901 carried by associates. The mobile terminal devices 901 that have been registered as associate terminals do not need notifications.

For example, for each mobile terminal device 901 for which nearby terminal information is registered, the associate terminal analysis unit 382 computes the number of times of detection of radio waves received from that mobile terminal device 901 during a designated period, and divides the number of times of detection by the time period from the starting date/time to the ending date/time. As a result thereof, the associate terminal analysis unit 382 computes the number of times that the radio waves have been received per unit time, and compares this number with a prescribed threshold value. Furthermore, the associate terminal analysis unit 382 registers the mobile terminal devices 901 for which the number of times that the radio waves have been received per unit time is equal to or greater than the threshold value as associates' mobile terminal devices 901 in the the associate terminal information.

The suspicious terminal analysis unit 190 excludes the mobile terminal devices 901 that are registered as associates' mobile terminal devices 901 from those requiring notifications to the user. For example, upon determining that a certain mobile terminal device 901 satisfies the conditions for being a suspicious terminal, the suspicious terminal analysis unit 190 determines whether or not that mobile terminal device 901 is registered as an associate's mobile terminal device 901. If it is determined to be registered as an associate's mobile terminal device 901, then the suspicious terminal analysis unit 190 blocks registration as a suspicious terminal and notification of the user.

Figure 14:
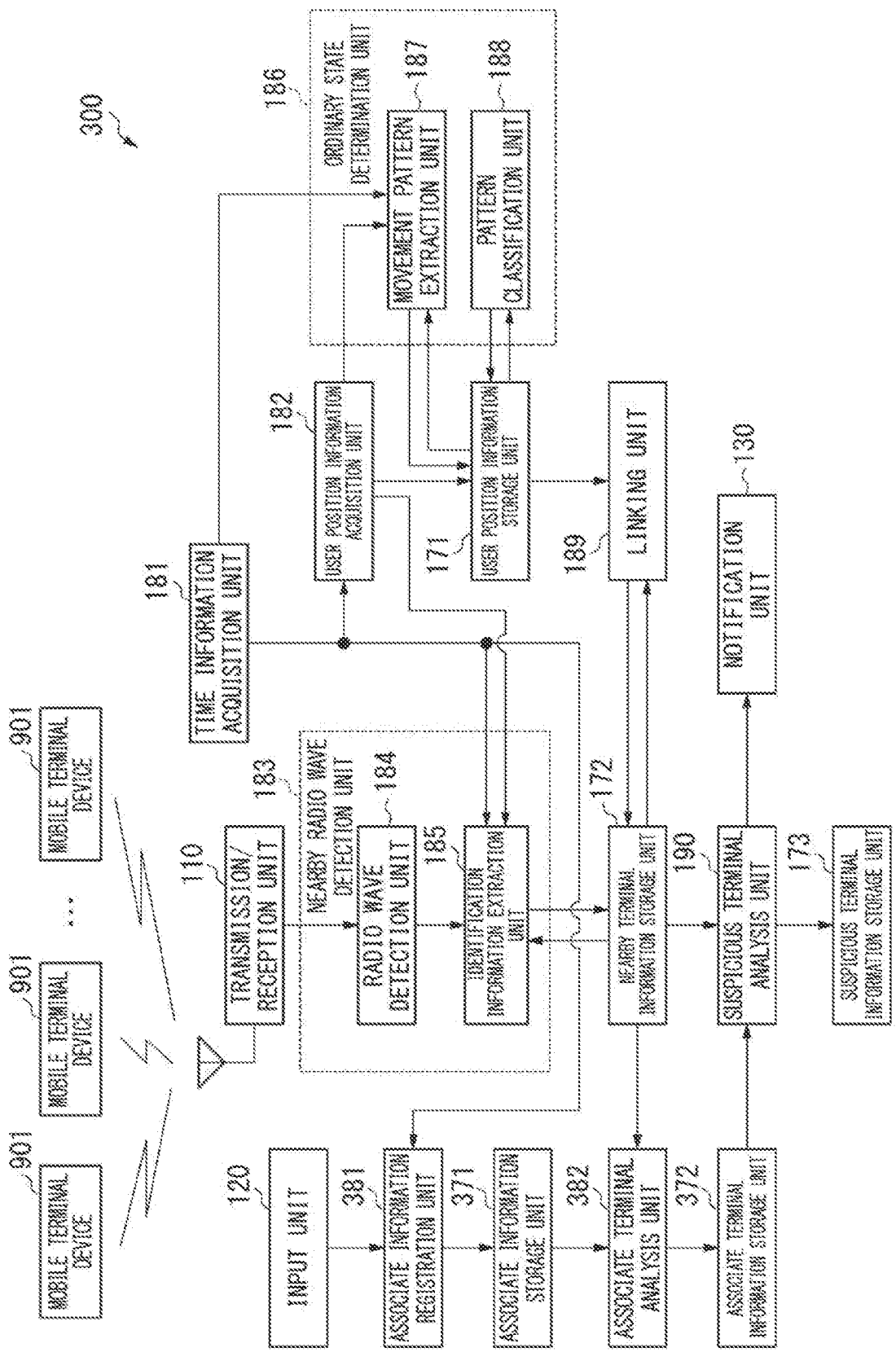
FIG. 14 is a diagram indicating an example of the input and output of data in each unit in the wireless terminal detection device according to the third embodiment.

FIG. 14 is a diagram indicating an example of the input and output of data in each unit in the wireless terminal detection device 300 according to the third embodiment.

In the example in FIG. 14, the time information acquisition unit 181 further outputs date/time information indicating the current date and time to the associate information registration unit 381 in addition to the user position information acquisition unit 182, the identification information extraction unit 185, and the movement pattern extraction unit 187.

The associate information registration unit 381 acquires the current time output from the time information acquisition unit 181 as the starting time at a timing at which the input unit 120 has received a user operation indicating the starting of a designated period. Additionally, the associate information registration unit 381 acquires the current time output from the time information acquisition unit 181 as the ending time at a timing at which the input unit 120 has received a user operation indicating the ending of a designated period. Additionally, the associate information registration unit 381 acquires the name of an associate obtained by the input unit 120 receiving user operations. The associate information registration unit 381 generates associate information based on these items of information and stores the associate information in the associate information storage unit 371. If the associate information storage unit 371 has already stored associate information, then the associate information registration unit 381 adds the obtained information to the associate information.

The associate terminal analysis unit 382 acquires the associate information from the associate information storage unit 371 and acquires the nearby terminal information for each mobile terminal device 901 from the nearby terminal information storage unit 172. The associate terminal analysis unit 382 counts, in the nearby terminal information, the number of times radio waves were detected (the number of times that the radio wave detection unit 184 detected the reception of radio waves) within the designated period indicated by the associate information, and computes the frequency of reception of the radio waves for each mobile terminal device 901 during the designated period.

Furthermore, the associate terminal analysis unit 382 determines mobile terminal devices 901 for which the frequency by which the radio waves have been received is equal to or greater than a designated threshold value to be associates' mobile terminal devices 901, generates associate terminal information, and stores the associate terminal information in the associate terminal information storage unit 372.

The suspicious terminal analysis unit 190 reads out the associate terminal information from the associate terminal information storage unit 372 and excludes the associates' mobile terminal devices 901 from the candidates for registration and notification as suspicious terminals.

Otherwise, the units in the wireless terminal detection device 300 in FIG. 14 are the same as the units in the wireless terminal detection device 100 in FIG. 4.

Next, the operations of the wireless terminal detection device 300 will be explained by referring to FIG. 15 and FIG. 16.

Figure 15:
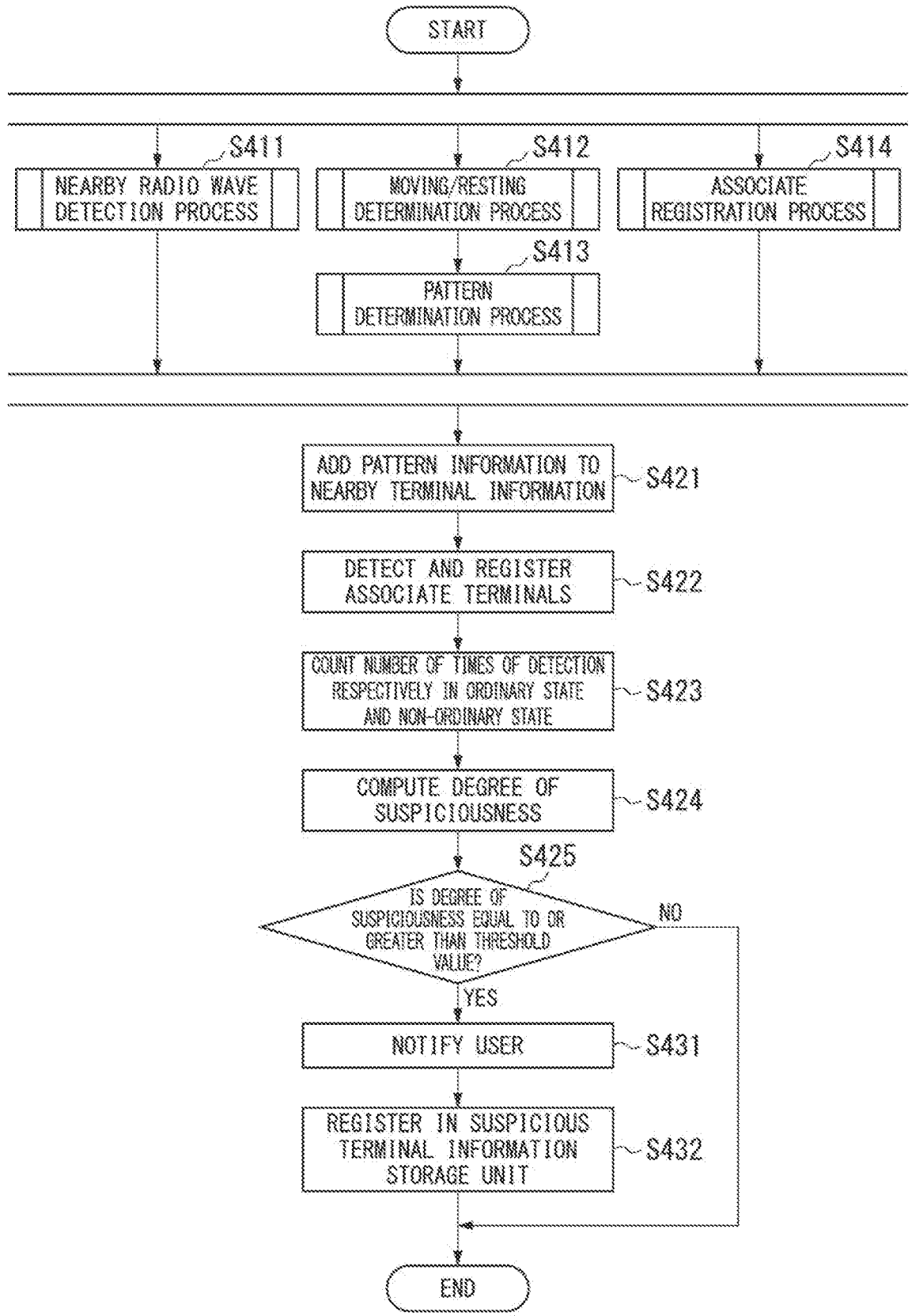
FIG. 15 is a flow chart indicating an example of a processing procedure performed by a wireless terminal detection device according to a third embodiment.

FIG. 15 is a flow chart indicating an example of a processing procedure performed by the wireless terminal detection device 300. The wireless terminal device 300 repeatedly performs the process in FIG. 15 in order to continuously monitor the radio waves from the mobile terminal devices 901.

Steps S411 to S413 in FIG. 15 are the same as steps S311 to S313 in FIG. 10.

Additionally, the associate information registration unit 381 generates associate information and stores the associate information in the associate information storage unit 371 (step S414).

After steps S411 to S414, the process transitions to step S421. Step S421 is the same as step S321 in FIG. 10.

After step S421, the associate terminal analysis unit 382 detects associate terminals, generates associate terminal information, and stores the associate information in the associate terminal information storage unit 372 (step S422).

Next, the suspicious terminal analysis unit 190 references the nearby terminal information stored in the nearby terminal information storage unit 172 for each mobile terminal device 901 that is a radio wave transmission source, and counts the number of times of detection of radio waves received from that mobile terminal device 901, respectively, in an ordinary state and a non-ordinary state (step S423). In step S423, the suspicious terminal analysis unit 190 excludes the associate terminals from those to be processed. Otherwise, step S423 is the same as step S322 in FIG. 10.

Steps S424 and S425 are respectively the same as steps S323 and S324 in FIG. 10. However, due to associate terminals having been excluded from those being processed in step S423, the associate terminals are also excluded from being processed in steps S424 and S425.

In step S425, if the degree of suspiciousness is determined to be equal to or greater than the threshold value (step S425: YES), then the suspicious terminal analysis unit 190 performs the processes in step S431 and S432. Steps S431 and S432 are the same as steps S331 and S332 in FIG. 10. However, due to associate terminals having been excluded from those being processed in step S423, the associate terminals are also excluded from being processed in steps S431 and S432.

After the process in step S432, the wireless terminal detection device 300 ends the process in FIG. 15.

On the other hand, if the suspicious terminal analysis unit 190 has determined that the degree of suspiciousness is lower than the threshold value in step S425 (step S425: NO), then the wireless terminal detection device 300 ends the process in FIG. 15. Therefore, in this case, the wireless terminal detection device 300 does not notify the user that a suspicious terminal has been detected and does not register suspicious terminal information.

Figure 16:
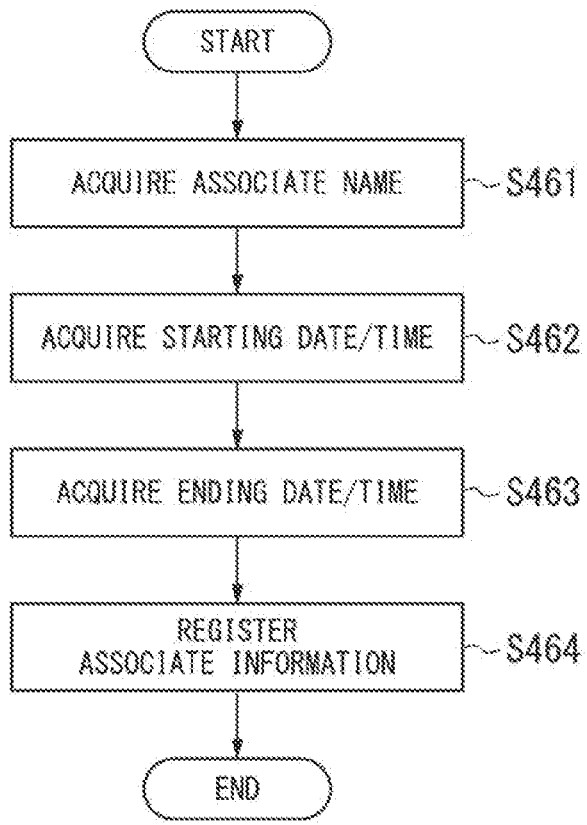
FIG. 16 is a diagram indicating an example of a processing procedure by which an associate information registration unit according to the third embodiment registers associate information.

FIG. 16 is a diagram indicating an example of a processing procedure by which an associate information registration unit 381 registers associate information.

The associate information registration unit 381 performs the process of FIG. 16 in step S414 in FIG. 15.

Alternatively, the wireless terminal detection device 300 may perform the process of FIG. 15 and the process of FIG. 16 in parallel. In this case, the associate information registration unit 381 performs the process of FIG. 16, for example, each time the input unit 120 receives user operations for registering associate information. Additionally, in this case, there is no need to provide a processing step for the process of FIG. 16 within the process of FIG. 15. Therefore, step S414 is omitted.

In the process of FIG. 16, the associate information registration unit 381 acquires the names of associates (step S461). For example, as mentioned above, the user performs a user operation on the input unit 120 to enter the name of an associate, and the associate information registration unit 381 acquires the name of the associate by means of this user operation.

Next, the associate information registration unit 381 acquires a starting date/time for a designated period (step S462). For example, as mentioned above, the user performs a user operation on the input unit 120 to indicate the starting of the designated period. The associate information registration unit 381 acquires, as the starting date/time, the current date/time output by the time information acquisition unit 181 at the timing at which this user operation was performed.

Additionally, the associate information registration unit 381 acquires an ending date/time for the designated period (step S463). For example, as mentioned above, the user performs a user operation on the input unit 120 to indicate the ending of the designated period. The associate information registration unit 381 acquires, as the ending date/time, the current date/time output by the time information acquisition unit 181 at the timing at which this user operation was performed.

Then, the associate information registration unit 381 registers the associate information in the associate information storage unit 371 (step S464). Specifically, the associate information registration unit 381 generates associate information indicating the name of the associate, the starting time, and the ending time that have been obtained, and stores the associate information in the associate information storage unit 371. If associate information is already stored in the associate information storage unit 371, then the associate information registration unit 381 adds the name of the associate, the starting time, and the ending time that have been obtained as one row of associate information in the associate information stored in the associate information storage unit 371.

After step S464, the wireless terminal detection device 300 ends the process in FIG. 16 and returns to the process in FIG. 15.

Although an example of the case in which the third embodiment is implemented based on the second embodiment was explained above, the third embodiment may be implemented based on the first embodiment. In particular, the suspicious terminal analysis unit 190 in the wireless terminal detection device 300 may be arranged to detect suspicious terminals based on the detection conditions of radio waves in non-ordinary times without using the detection conditions of radio waves in ordinary times.

As mentioned above, the associate terminal analysis unit 382 registers, as notification-unneeded, the wireless terminal devices 901 of radio wave transmission sources for which the reception of radio waves by the wireless terminal detection device 300 has been detected with a frequency equal to or greater than a prescribed frequency within a designated period. The suspicious terminal analysis unit 190 determines whether or not notification to the user is required based on the reception history of radio waves from mobile terminal devices 901 other than the mobile terminal devices 901 that have been registered as notification-unneeded.

As a result thereof, the wireless terminal detection device 300 can exclude specific mobile terminal devices 901 from those requiring notification in accordance with designations by the user, and in this regard, can more appropriately provide notifications.

Additionally, the user simply needs to designate a period for registering a associate terminal and can register the associate terminal in the wireless terminal detection device 300 without requiring knowledge of identification information for the associate terminal, such as the MAC address of the associate terminal.

Examples of Configurations of Embodiments

Next, examples of configurations of embodiments will be explained with reference to FIG. 17 and FIG. 18.

Figure 17:
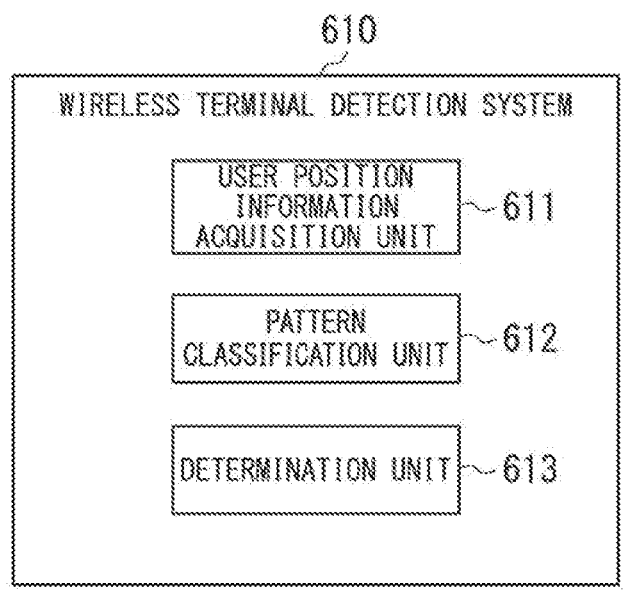
FIG. 17 is a diagram indicating an example of the configuration of a wireless terminal detection system according to an embodiment.

FIG. 17 is a diagram indicating an example of the configuration of a wireless terminal detection system according to an embodiment. The wireless terminal detection system 610 indicated in FIG. 17 comprises a user position information acquisition unit 611, a pattern classification unit 612, and a determination unit 613.

In this configuration, the user position information acquisition unit 611 measures the position of the reception-side wireless terminal. The pattern classification unit 612 classifies the movement patterns extracted from the position history information of the reception-side wireless terminal as ordinary patterns or non-ordinary patterns based on classification results in which the movement patterns are classified by times and positions. The determination unit 613 determines suspicious terminals among the transmission-side wireless terminals that are the transmission sources of radio waves received by the reception-side wireless terminal based on the reception history of radio waves from the transmission-side wireless terminals in time intervals classified as non-ordinary patterns.

As a result thereof, the wireless terminal detection system 610 can determine whether or not to notify a user by using not only whether or not radio waves are detected at the same location every time, but also information regarding whether the movement pattern of the user when the radio waves are received is an ordinary pattern or a non-ordinary pattern.

Figure 18:
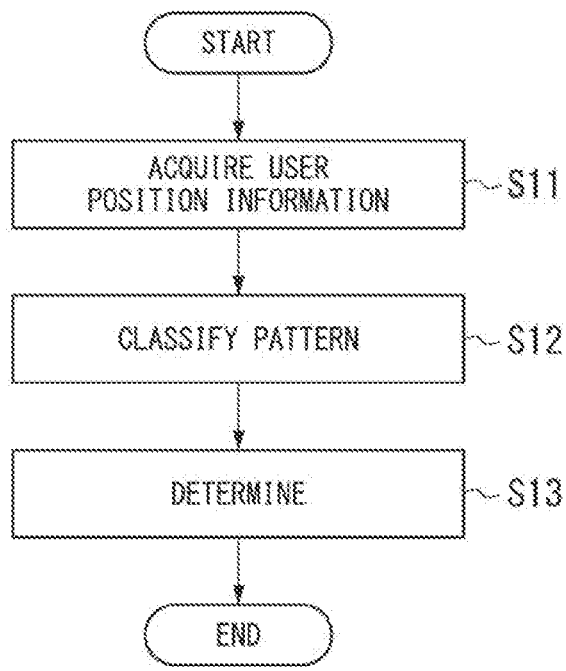
FIG. 18 is a diagram indicating an example of a processing procedure in a wireless terminal detection method according to an embodiment.

FIG. 18 is a diagram indicating an example of a processing procedure in a wireless terminal detection method according to an embodiment.

The process in FIG. 18 includes a user position information acquisition step (step S11), a pattern classification step (step S12), and a determination step (step S13).

In the user position information acquisition step (step S11), the position of the reception-side wireless terminal is measured. In the pattern classification step (step S12), the movement patterns extracted from the position history information of the reception-side wireless terminal are classified as ordinary patterns or non-ordinary patterns based on classification results in which the movement patterns are classified by times and positions. In the determination step (step S13), suspicious terminals among the transmission-side wireless terminals that are the transmission sources of radio waves received by the reception-side wireless terminal are determined based on the reception history of radio waves from the transmission-side wireless terminals in time intervals classified as non-ordinary patterns.

As a result thereof, with the process in FIG. 18, it is possible to determine whether or not to notify a user by using not only whether or not radio waves are detected at the same location every time, but also information regarding whether the movement pattern of the user when the radio waves are received is an ordinary pattern or a non-ordinary pattern.

Figure 19:
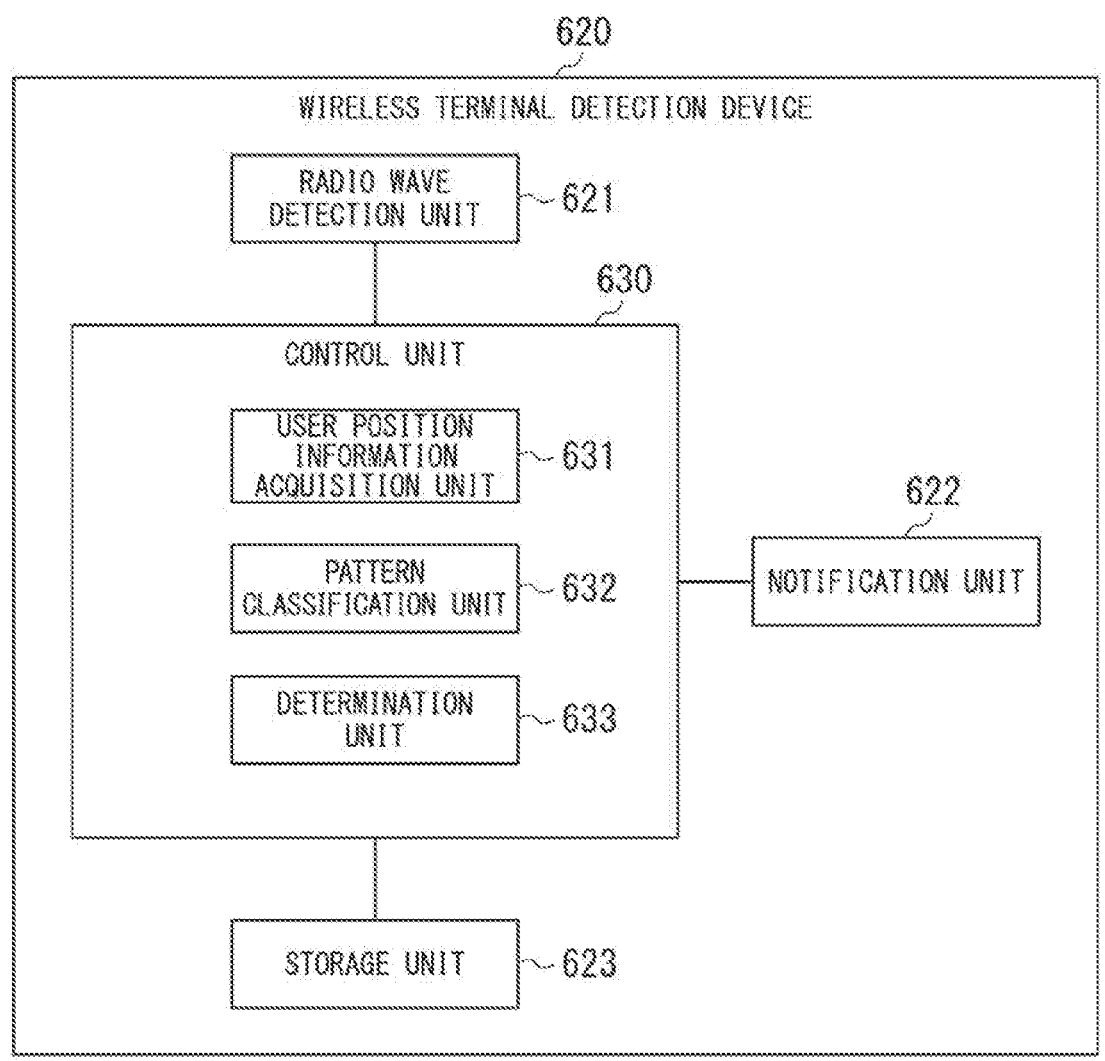
FIG. 19 is a diagram indicating an example of the configuration of a wireless terminal detection device according to an embodiment.

FIG. 19 is a diagram indicating an example of the configuration of a wireless terminal detection device according to an embodiment.

In the configuration indicated in FIG. 19, a wireless terminal detection device 620 comprises a radio wave detection unit 621, a notification unit 622, a storage unit 623, and a control unit 630. The control unit 630 comprises a user position information acquisition unit 631, a pattern classification unit 632, and a determination unit 633.

The radio wave detection unit 621 is configured so as to include, for example, an antenna and a receiver, and detects received radio waves.

The notification unit 622 is configured so as to include, for example, a notification means such as a display screen, and provides the user with notifications in accordance with control by the control unit 630.

The storage unit 623 is configured so as to use a storage device provided in the wireless terminal detection device 620, and stores various types of information.

The control unit 630 is configured so as to use a CPU provided in the wireless terminal detection device 620, and controls the units in the wireless terminal detection device 620 to perform various processes.

The user position information acquisition unit 631 measures the position of the wireless terminal detection device 620.

The pattern classification unit 632 classifies the movement patterns extracted from the position history information of the wireless terminal detection device 620 as ordinary patterns or non-ordinary patterns based on classification results in which the movement patterns are classified by times and positions.

The determination unit 633 determines whether or not the user should be notified regarding wireless terminals that are the transmission sources of radio waves received by the radio wave detection unit 621 based on the reception history of radio waves from the transmission-side wireless terminals in time intervals classified as non-ordinary patterns.

If the determination unit 633 determines that a notification to the user is necessary, then the notification unit 622 provides a notification. According to the wireless terminal detection device 620, it is possible to determine whether or not notification to the user is required by using not only whether or not radio waves are detected at the same location every time, but also information regarding whether the movement pattern of the user when the radio waves are received is an ordinary pattern or a non-ordinary pattern.

Figure 20:
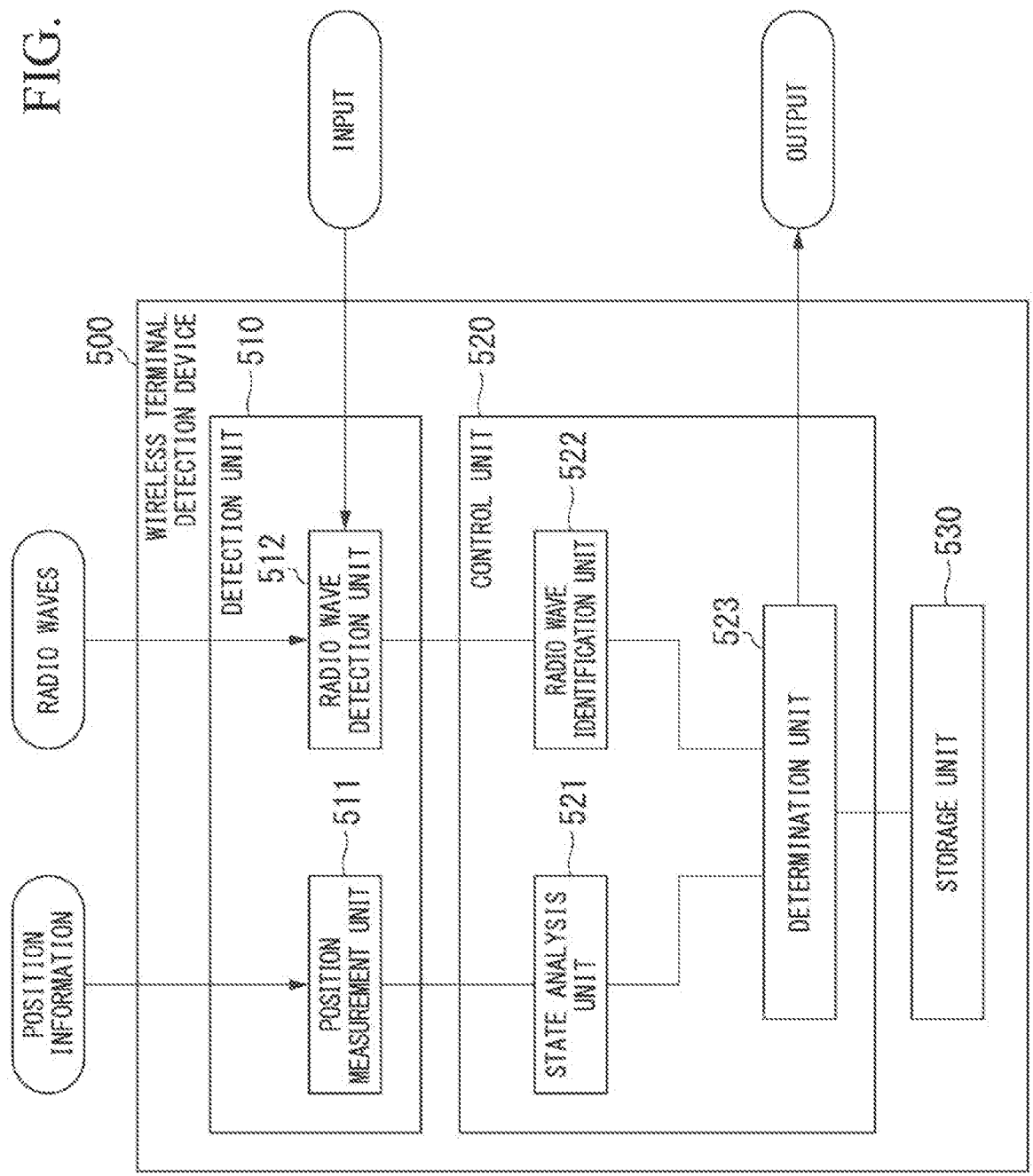
FIG. 20 is a diagram indicating another example of the configuration of a wireless terminal detection device according to an embodiment.

FIG. 20 is a diagram indicating another example of the configuration of a wireless terminal detection device according to an embodiment.

In the configuration indicated in FIG. 20, a wireless terminal detection device 500 comprises a detection unit 510, a control unit 520, and a storage unit 530. The detection unit 510 comprises a position measurement unit 511 and a radio wave detection unit 512. The control unit 520 comprises a state analysis unit 521, a radio wave identification unit 522, and a determination unit 523.

In this configuration, the position measurement unit 511 comprises a positioning means such as, for example, a GNSS terminal device, and measures the position of the host device. The host device mentioned here is the device in which the unit itself is provided. The host device of the position measurement unit 511 is the wireless terminal detection device 500 in which the position measurement unit 511 itself is provided. The position measurement unit 511 outputs, to the state analysis unit 521, information in which position information of the host device is linked with measurement dates/times.

Upon receiving instructions by user operations or the like, the radio wave detection unit 512 detects radio waves generated by individual wireless terminals from among the radio waves received by means of an antenna or the like.

The state analysis unit 521 analyzes (determines) whether the state of the host device is an ordinary state or a non-ordinary state based on the positions of the host device measured by the position measurement unit 511, and the days of the week and times of the measurement dates/times.

The radio wave identification unit 522 identifies individual wireless terminals from among the radio waves from individual wireless terminals detected by the radio wave detection unit 512. Specifically, the radio wave identification unit 522 extracts identification information for identifying wireless terminals among the individual wireless terminals detected by the radio wave detection unit 512.

The storage unit 530 stores the state of the host device analyzed by the state analysis unit 521 so as to be associated (linked) with the identification information of wireless terminals identified by the radio wave identification unit 522 at that time. In the configuration in FIG. 20, the storage unit 530 is connected to the state analysis unit 521 and the radio wave identification unit 522 by way of the determination unit 523. However, it may be connected directly to the state analysis unit 521 and the radio wave identification unit 522 without having the determination unit 523 interposed therebetween.

The determination unit 523 acquires the state of the host device analyzed by the state analysis unit 521 and the identification information of the wireless terminal identified by the radio wave identification unit 522. Furthermore, the determination unit 523 extracts, from the information stored in the storage unit 530, information indicating wireless terminals having the same identification information as wireless terminals identified by the radio wave identification unit 522 and the states of the host device at the time those radio waves were received, collates the information, and outputs the collation results. Due to this collation, the determination unit 523 determines whether or not notification to the user is required based on the reception conditions, in at least a non-ordinary state, of radio waves from wireless terminals (wireless terminals that are transmission sources of radio waves from which the radio wave identification unit 522 has extracted the identification information) that are determination targets. Specifically, the determination unit 523 outputs a notification to the user if, based on determination standards for suspicious terminals (wireless terminals that are suspicious), the reception conditions of the radio waves are determined to satisfy the determination standards. The output is performed by screen display, audio output, or the like.

According to the wireless terminal detection device 500, it is possible to determine whether or not to notify a user by using not only whether or not radio waves are detected at the same location every time, but also information regarding whether the state of the user when the radio waves are received is an ordinary state or a non-ordinary state (information regarding whether the movement pattern of the user when the radio waves are received is an ordinary pattern or a non-ordinary pattern).

Figure 21:
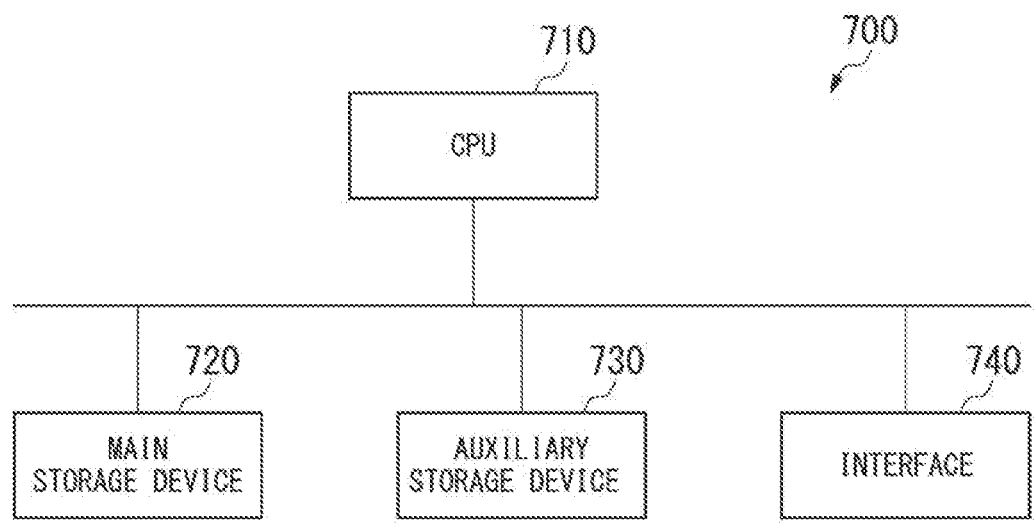
FIG. 21 is a schematic block diagram indicating the configuration of a computer according to at least one embodiment.

FIG. 21 is a schematic block diagram indicating the configuration of a computer according to at least one embodiment.

In the configuration indicated in FIG. 21, a computer 700 comprises a CPU 710, a main storage device 720, an auxiliary storage device 730, and an interface 740.

Any one or more of the wireless terminal detection device 100, the wireless terminal detection device 300, the wireless terminal detection device 500, or the wireless terminal detection system 610 described above may be implemented in the computer 700. In that case, the operations in the above-mentioned processing units are stored, in the form of a program, in the auxiliary storage device 730. The CPU 710 reads the program from the auxiliary storage device 730, loads the program in the main storage device 720, and executes the above-mentioned processes in accordance with the program. Additionally, the CPU 710 secures, in the main storage device 720, storage areas corresponding to the above-mentioned storage units in accordance with the program. Communication between the respective devices and other devices are executed by the interface 740 having a communication function and communicating in accordance with control by the CPU 710.

In the case in which the wireless terminal detection device 100 is implemented on the computer 700, the operations of the control unit 180 and the respective units therein are stored in the auxiliary storage device 730 in the form of a program. The CPU 710 reads the program from the auxiliary storage device 730, loads the program in the main storage device 720, and executes the above-mentioned processes in accordance with the program.

Additionally, the CPU 710 secures, in the main storage device 720, storage areas corresponding to the storage unit 170 and the respective units therein in accordance with the program. The communication performed by the transmission/reception unit 110 is performed by the interface 740 having a communication function and communicating in accordance with control by the CPU 710. The functions of the input unit 120 are executed by the interface 740 comprising an input device and receiving user operations. The functions of the notification unit 130 are executed by the interface 740 having a notification means such as, for example, a display screen, and providing notifications in accordance with control by the CPU 710.

In the case in which the wireless terminal detection device 300 is implemented on the computer 700, the operations of the control unit 380 and the respective units therein are stored in the auxiliary storage device 730 in the form of a program. The CPU 710 reads the program from the auxiliary storage device 730, loads the program in the main storage device 720, and executes the above-mentioned processes in accordance with the program.

Additionally, the CPU 710 secures, in the main storage device 720, storage areas corresponding to the storage unit 370 and the respective units therein in accordance with the program. The communication performed by the transmission/reception unit 110 is performed by the interface 740 having a communication function and communicating in accordance with control by the CPU 710. The functions of the input unit 120 are executed by the interface 740 comprising an input device and receiving user operations. The functions of the notification unit 130 are executed by the interface 740 having a notification means such as, for example, a display screen, and providing notifications in accordance with control by the CPU 710.

In the case in which the wireless terminal detection device 500 is implemented on the computer 700, the operations of the control unit 520 and the respective units therein are stored in the auxiliary storage device 730 in the form of a program. The CPU 710 reads the program from the auxiliary storage device 730, loads the program in the main storage device 720, and executes the above-mentioned processes in accordance with the program.

Additionally, the CPU 710 secures, in the main storage device 720, storage areas corresponding to the storage unit 530 in accordance with the program. The positioning performed by the position measurement unit 511 is executed, for example, by the interface 740 having a GNSS terminal device, and receiving and processing radio waves from a GNSS satellite. The detection of radio waves by the radio wave detection unit 512 is executed, for example, by the interface 740 having a wireless receiver, and receiving and processing radio waves. The input to the radio wave detection unit 512 is executed by the interface 740 comprising an input device and receiving user operations. The output from the determination unit 523 is executed by the interface 740 having a notification means such as, for example, a display screen, and providing notifications in accordance with control by the CPU 710.

In the case in which the wireless terminal detection system 610 is implemented on the computer 700, the operations of the user position information acquisition unit 611, the pattern classification unit 612, and the determination unit 613 are stored in the auxiliary storage device 730 in the form of a program. The CPU 710 reads the program from the auxiliary storage device 730, loads the program in the main storage device 720, and executes the above-mentioned processes in accordance with the program.

A program for realizing all or some of the functions of the wireless terminal detection device 100, the wireless terminal detection device 300, or the wireless terminal detection system 610 may be recorded on a computer-readable recording medium, and the program recorded on this recording medium may be read into and executed by a computer system to perform the processes of the respective units. The "computer system" mentioned here includes an OS (operating system) and hardware such as peripheral devices.

The "computer-readable recording medium" refers to a portable medium such as a flexible disk, a magneto-optic disk, a ROM (Read-Only Memory), a CD-ROM (Compact Disc Read-Only Memory), or the like, or to a storage device such as a hard disk internal to a computer system. Additionally, the above-mentioned program may be for realizing some of the aforementioned functions, and furthermore, the aforementioned functions may be realized by being combined with a program already recorded in the computer system.

While embodiments of the present invention have been explained in detail with reference to the drawings above, the specific configurations are not limited to those in these embodiments, and design modifications and the like within a range not departing from the spirit of the present invention are also included.

The present application claims the benefit of priority based on Japanese Patent Application No. 2019-130569, filed Jul. 12, 2019, the entire disclosure of which is incorporated herein by reference.

INDUSTRIAL APPLICABILITY

The present invention can determine whether or not a user needs to be notified not only based on whether or not radio waves are detected at the same location every time, but also by using other information.

REFERENCE SIGNS LIST 100, 300, 500 Wireless terminal detection device
110 Transmission/reception unit
120 Input unit
130 Notification unit
170, 370, 530, 623 Storage unit
171 User position information storage unit
172 Nearby terminal information storage unit
173 Suspicious terminal information storage unit
180, 380, 520, 630 Control unit
181 Time information acquisition unit
182, 611, 631 User position information acquisition unit
183 Nearby conditions detection unit
184, 512, 621 Radio wave detection unit
185 Identification information extraction unit
186 Ordinary state determination unit
187 Movement pattern extraction unit 188, 612, 632 Pattern classification unit
189 Linking unit
190 Suspicious terminal analysis unit
371 Associate information storage unit
372 Associate terminal information storage unit
381 Associate information registration unit
382 Associate terminal analysis unit
510 Detection unit
511 Position measurement unit
521 State analysis unit
522 Radio wave identification unit
523, 613, 633 Determination unit
610 Wireless terminal detection system

What is claimed is:

1. A wireless terminal detection system comprising:
at least one memory configured to store instructions; and
at least one processor configured to execute the instructions to:
measure a position of a reception-side wireless terminal;
determine, based on position history information of the reception-side wireless terminal, whether the reception-side wireless terminal is moving or resting at a position measurement date/time indicated by the position history information, and extract, as time intervals of individual movement patterns, respectively, time intervals from when the reception-side wireless terminal starts moving until the moving ends and time intervals from when the reception-side wireless terminal starts resting until the resting ends;
classify the movement patterns into ordinary patterns and non-ordinary patterns based on classification results in which the movement patterns are classified in accordance with times and positions; and
determine whether a transmission-side wireless terminal, which is a transmission source of radio waves received by the reception-side wireless terminal, is a suspicious terminal based on a reception history of radio waves from the transmission-side wireless terminal in time intervals classified as the non-ordinary patterns.

2. The wireless terminal detection system according to claim 1, wherein the at least one processor is configured to execute the instructions to determine whether or not notification to a user is required based on a number of days that the reception-side wireless terminal has received radio waves from a transmission-side wireless terminal that is a determination target.

3. The wireless terminal detection system according to claim 1, wherein the at least one processor is configured to execute the instructions to determine whether or not notification to a user is required based on a cumulative time period during which the reception-side wireless terminal has received radio waves from a transmission-side wireless terminal that is a determination target.

4. A wireless terminal detection device comprising:
at least one memory configured to store instructions; and
at least one processor configured to execute the instructions to:
measure a position of a reception-side wireless terminal;
determine, based on position history information of the reception-side wireless terminal, whether the reception-side wireless terminal is moving or resting at a position measurement date/time indicated by the position history information, and extract, as time intervals of individual movement patterns, respectively, time intervals from when the reception-side wireless terminal starts moving until the moving ends and time intervals from when the reception-side wireless terminal starts resting until the resting ends;
classify the movement patterns into ordinary patterns and non-ordinary patterns based on classification results in which the movement patterns are classified in accordance with times and positions; and
determine whether a transmission-side wireless terminal, which is a transmission source of radio waves received by the reception-side wireless terminal, is a suspicious terminal based on a reception history of radio waves from the transmission-side wireless terminal in time intervals classified as the non-ordinary patterns.

5. The wireless terminal detection device according to claim 4, wherein the at least one processor is configured to execute the instructions to determine whether or not notification to a user is required based on a number of days that the reception-side wireless terminal has received radio waves from a transmission-side wireless terminal that is a determination target.

6. The wireless terminal detection device according to claim 4, wherein the at least one processor is configured to execute the instructions to determine whether or not notification to a user is required based on a cumulative time period during which the reception-side wireless terminal has received radio waves from a transmission-side wireless terminal that is a determination target.

7. A wireless terminal detection method comprising:
measuring a position of a reception-side wireless terminal;
determining, based on position history information of the reception-side wireless terminal, whether the reception-side wireless terminal is moving or resting at a position measurement date/time indicated by the position history information, and extracting, as time intervals of individual movement patterns, respectively, time intervals from when the reception-side wireless terminal starts moving until the moving ends and time intervals from when the reception-side wireless terminal starts resting until the resting ends;
classifying the movement patterns into ordinary patterns and non-ordinary patterns based on classification results in which the movement patterns are classified in accordance with times and positions; and
determining whether a transmission-side wireless terminal, which is a transmission source of radio waves received by the reception-side wireless terminal, is a suspicious terminal based on a reception history of radio waves from the transmission-side wireless terminal in time intervals classified as the non-ordinary patterns.

8. The wireless terminal detection method according to claim 7, wherein the determining includes determining whether or not notification to a user is required based on a number of days that the reception-side wireless terminal has received radio waves from a transmission-side wireless terminal that is a determination target.

9. The wireless terminal detection method according to claim 7, wherein the determining includes determining whether or not notification to a user is required based on a cumulative time period during which the reception-side wireless terminal has received radio waves from a transmission-side wireless terminal that is a determination target.

* * * * *